US009733408B2

United States Patent
Kasai

(10) Patent No.: US 9,733,408 B2
(45) Date of Patent: Aug. 15, 2017

(54) DISPLAY DEVICE AND TELEVISION DEVICE

(71) Applicant: Sharp Kabushiki Kaisha, Osaka-shi, Osaka (JP)

(72) Inventor: Nobuhiro Kasai, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 103 days.

(21) Appl. No.: 14/405,817

(22) PCT Filed: Jul. 17, 2013

(86) PCT No.: PCT/JP2013/069359
§ 371 (c)(1),
(2) Date: Dec. 5, 2014

(87) PCT Pub. No.: WO2014/017346
PCT Pub. Date: Jan. 30, 2014

(65) Prior Publication Data
US 2015/0146113 A1    May 28, 2015

(30) Foreign Application Priority Data

Jul. 24, 2012 (JP) ................................. 2012-163828

(51) Int. Cl.
*F21V 8/00* (2006.01)
*G02F 1/1333* (2006.01)

(52) U.S. Cl.
CPC ........... *G02B 6/002* (2013.01); *G02B 6/0018* (2013.01); *G02B 6/0068* (2013.01);
(Continued)

(58) Field of Classification Search
CPC .... G02B 6/002; G02B 6/0018; G02B 6/0088; G02B 6/0033; G02B 6/0011; G02B 6/088;
(Continued)

(56) References Cited

U.S. PATENT DOCUMENTS

2002/0044234 A1\* 4/2002 Choi .................... G02B 6/0088
349/65
2008/0291697 A1\* 11/2008 Sun ...................... G02B 6/0088
362/628
(Continued)

FOREIGN PATENT DOCUMENTS

JP    2008-034223 A    2/2008
JP    2011-108366 A    6/2011

*Primary Examiner* — Jessica M Merlin
(74) *Attorney, Agent, or Firm* — Keating & Bennett, LLP

(57) ABSTRACT

A display device 10 includes a display panel 11, a light source row 170, a light guide plate 16, a chassis 14 and a recess portion 134b that is fitted the chassis 14. The light guide plate 16 includes a positioning projection portion 160 that is fitted to the recess portion 134b. The positioning projection portion 160 projects outwardly from a side edge surface 16e of the light guide plate 16. The positioning projection portion 160 has a projection, and among rays of light emitted from an end light source 17X included in the light source row 170 and entering the light guide plate through a light entrance surface 16b, narrow-angle light L2 directed outward at an angle α (a critical angle θc) with respect to an optical axis L1 enters the projection. The positioning projection portion 160 includes a first edge surface 161 and a second edge surface 162. The first edge surface 161 is parallel to a side edge surface 16e and the narrow-angle light L2 reaches the first edge surface 161. The second edge surface 162 is between the side edge surface 16e and the first end surface 161 and is inclined such that an external angle β between the first edge surface 161 and the second edge surface 162 is equal to or smaller than the critical angle θc.

13 Claims, 15 Drawing Sheets

(52) U.S. Cl.
CPC ......... *G02B 6/0073* (2013.01); *G02B 6/0088* (2013.01); *G02F 1/133308* (2013.01); *G02B 6/0085* (2013.01); *G02F 2001/133314* (2013.01)

(58) Field of Classification Search
CPC ... G02F 2001/133607; G02F 1/133606; G02F 1/133603
See application file for complete search history.

(56) References Cited

U.S. PATENT DOCUMENTS

| | | | |
|---|---|---|---|
| 2009/0244431 | A1 | 10/2009 | Shirota |
| 2010/0171898 | A1* | 7/2010 | Lee .................. G02F 1/133308 349/58 |
| 2011/0110115 | A1 | 5/2011 | Hashimoto |
| 2011/0261276 | A1* | 10/2011 | Yu ....................... G02B 6/0028 349/16 |
| 2012/0013811 | A1* | 1/2012 | Shimizu .............. G02B 6/0016 348/739 |
| 2012/0218752 | A1* | 8/2012 | Sumitani ................ F21V 11/14 362/235 |

* cited by examiner

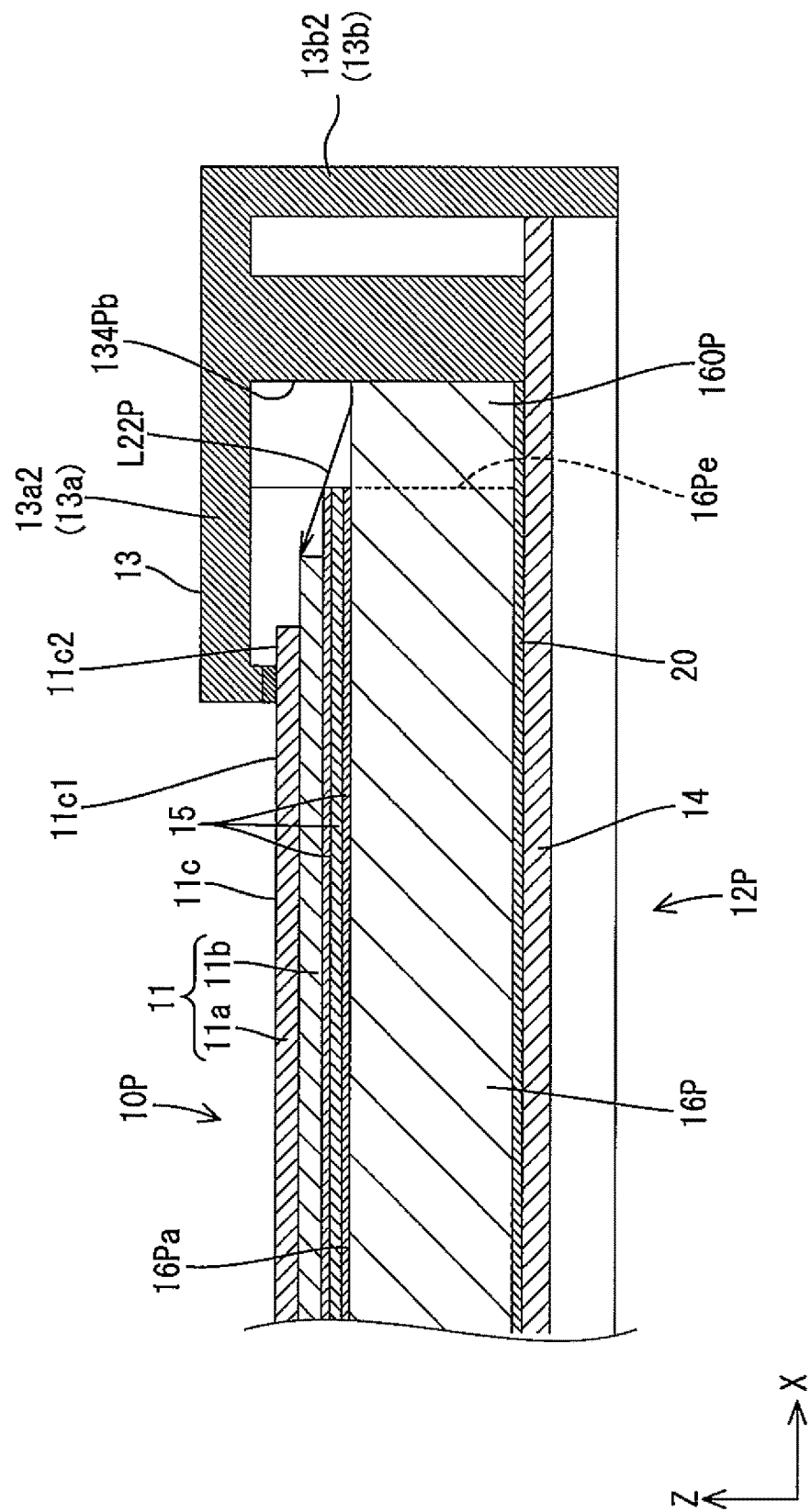

DISPLAY DEVICE AND TELEVISION DEVICE

TECHNICAL FIELD

The present invention relates to a display device and a television device.

BACKGROUND ART

Liquid crystal panels are generally used for displays in television devices, mobile phones, and mobile information terminals. The liquid crystal panels do not emit light, and thus use light from lighting devices (namely, backlight devices). Such a lighting device is arranged on a rear surface side of the liquid crystal panel and configured to output planer light toward a rear surface of the liquid crystal panel.

Such a lighting device includes a light guide plate and light sources arranged to be opposed to an edge surface of the light guide plate as disclosed in Patent Document 1. Such a lighting device is generally known as a side-light type (or an edge-light type) lighting device, and the edge surface of the light guide plate is a light entrance surface through which light emitted from the light source enters the light guide plate and a front-side plate surface of the light guide plate is a light exit surface through which the light exits the light guide plate toward the rear surface of the liquid crystal panel.

The liquid crystal panel that is held between a metal frame member and a plastic frame member having a light-blocking property is generally arranged on the light exit surface side of the lighting device. The metal frame member is arranged to cover a front-side peripheral edge of the liquid crystal panel and the plastic frame member is arranged to cover a rear-side peripheral edge of the liquid crystal panel.

With a recent demand for reduction in thickness of the display device, a display device without having the frame member arranged on the rear-surface side of the liquid crystal panel has been proposed. In such a kind of display device, the liquid crystal panel is arranged on a front-side plate surface of the light guide plate.

As is disclosed in Patent Document 2, it is known that the light guide plate is fixed within the lighting device by using a projection portion included on a side surface of the light guide plate. In recent years, LEDs that are linearly arranged (hereinafter, a LED row) have been used as the light source in the lighting device.

RELATED ART DOCUMENT

Patent Document

Patent Document 1: Japanese Unexamined Patent Application Publication No. 2008-34223
Patent Document 2: Japanese Unexamined Patent Application Publication No. 2011-108366

Problem to be Solved by the Invention

In such a lighting device including the light guide plate that is fixed with the projection portion, if the light emitted from the light source is guided into the projection portion, the light exits the projection portion outside thereof and may enter the liquid crystal panel through the side surface thereof. If the light enters the liquid crystal panel through the side surface thereof, linear unevenness in brightness may occur on the display surface of the liquid crystal panel. For example, if the light enters the liquid crystal panel through the side surface thereof, a linear bright portion, which has brightness extremely higher than its surrounding portion, may be displayed on the liquid crystal panel with black display. Such unevenness in brightness occurs in the display device that does not include a frame member on a rear-surface side peripheral edge of the liquid crystal panel and that includes a liquid crystal panel arranged on a light guide plate with an optical sheet therebetween.

Disclosure of the Present Invention

An object of the technology described herein is to provide a display device where light exiting a positioning projection portion included on a side surface of a light guide plate is less likely to enter a display panel through a side surface thereof.

Means for Solving the Problem

A technology disclosed herein relates to a display device including a display panel having a display surface on a front side thereof, a light source row including light sources arranged in a row, a light guide plate being a plate member, a chassis and a recess portion. The light guide plate includes a light entrance surface that is an edge surface of the plate member and opposed to the light source row and through which light from each of the light sources enters the light guide plate, a light exit surface that is a front-side surface of the plate member and through which light exits the light guide plate toward a rear side of the display panel, a side edge surface that is an edge surface of the plate member adjacent to the light entrance surface, and a positioning projection portion included in the side edge surface at a portion that is close to the light entrance surface. The side edge surface is substantially perpendicular to the light entrance surface and on an outer side than an edge of the display panel. The positioning projection portion projects outwardly from the side edge surface and has a projection. Among rays of light emitted from an end light source that is arranged at an end of the light source row and entering the light guide plate through the light entrance surface, narrow-angle light directed outward at an angle α(the angle α is equal to a critical angle θc) with respect to an optical axis of the end light source enters the projection. The positioning projection portion includes a first edge surface and a second edge surface. The first edge surface is an edge surface of the projection that is farthest from the side edge surface and parallel to the side edge surface and the narrow-angle light reaches the first edge surface. The second edge surface is an inclined edge surface of the projection between the side edge surface and the first end surface, and the second edge surface and the first edge surface form an external angle β that is equal to or smaller than the critical angle θc. The chassis has a plate shape and is configured to cover a rear side of the light guide plate and hold the positioning projection portion therein. The recess portion is configured to fit to the positioning projection portion to be positioned with respect to the chassis.

According to the display device, the light guide plate includes the positioning projection portion. The positioning projection portion is included in the side edge surface at a portion that is close to the light entrance surface. The positioning projection portion projects outwardly from the side edge surface. Among rays of light emitted from the end light source and entering the light guide plate through the light entrance surface, narrow-angle light directed outward at an angle α with respect to an optical axis of the end light source enters the positioning projection portion. The angle α is equal to a critical angle θc of the plate member (the light guide plate). The positioning projection portion includes a first edge surface and a second edge surface. The first edge surface is farthest from the side edge surface and parallel to the side edge surface and the narrow-angle light reaches the first edge surface. The second edge surface is an inclined edge surface between the side edge surface and the first end surface and the second edge surface and the first edge surface form an external angle β that is equal to or smaller than the critical angle θc. According to such a display device, among the rays of light emitted from the end side light source, if the narrow-angle light entering the light guide plate through the light entrance surface and directed outwardly at an angle α with respect to the optical axis of the end side light source reaches the second edge surface, the narrow-angle light is refracted by the second edge surface and passes through the second edge surface and directed to be away from the side edge surface. Among the rays of light emitted from the end side light source, the reflection light that enters the light guide plate through the light entrance surface and travels within the positioning projection portion and reflects off the first edge surface is always incident on the second edge surface at an angle equal to or greater than the critical angle θc. The reflection light totally reflects off the second edge surface and is less likely to leak through the second edge surface to outside. Namely, even if the light emitted from the end side light source travels into the positioning projection portion and reaches the first edge surface or the second edge surface, the light is less likely to leak from the light guide plate through the edge surface toward the side edge surface side of the light guide plate where the edge portion of display panel is. As a result, light is less likely to enter the display panel through the edge portion thereof and linear uneven brightness is less likely to be caused on the display surface of the display panel.

In the display device, an external angle β may be 43° or smaller.

In the display device, an external angle β may be 20° or greater.

In the display device, the angle α may be 43° or smaller.

In the display device, the light guide plate may be made of one of materials including PMMA, PS, MS, and PC.

In the display device, the light sources may be light emitting diodes having a light distribution following the Lambertian distribution.

In the display device, the light sources may be white light emitting diodes.

In the display device, a distance from the side edge surface to the optical axis of the end light source may be equal to or smaller than a length of the first edge surface with a front-side plan view of the light guide plate.

In the display device, the display panel may be a liquid crystal display panel including a pair of substrates and liquid crystals enclosed therebetween.

A television device according to the present embodiment includes the display device.

Advantageous Effect of the Invention

According to the display device, light leaking from the positioning projection portion included in the light guide plate at a side edge surface is less likely to enter the display panel through an edge surface thereof.

BRIEF DESCRIPTION OF THE DRAWINGS

FIG. 15 is a view of the liquid crystal display device according to a comparative example typically illustrating light exiting a positioning projection portion of the light guide plate toward an edge portion of a liquid crystal panel.

MODE FOR CARRYING OUT THE INVENTION

First Embodiment

A first embodiment of the present invention will be described with reference to FIGS. 1 to 10. A television device TV and a liquid crystal display device 10 according to this embodiment will be described. X-axis, Y-axis and Z-axis are indicated in each of the drawings. The axes in each drawing correspond to the respective axes in other drawings. An upper side and a lower side in FIGS. 3 and 4 correspond to a front side (a display surface side) and a rear side (a rear surface side), respectively.

Figure 1:
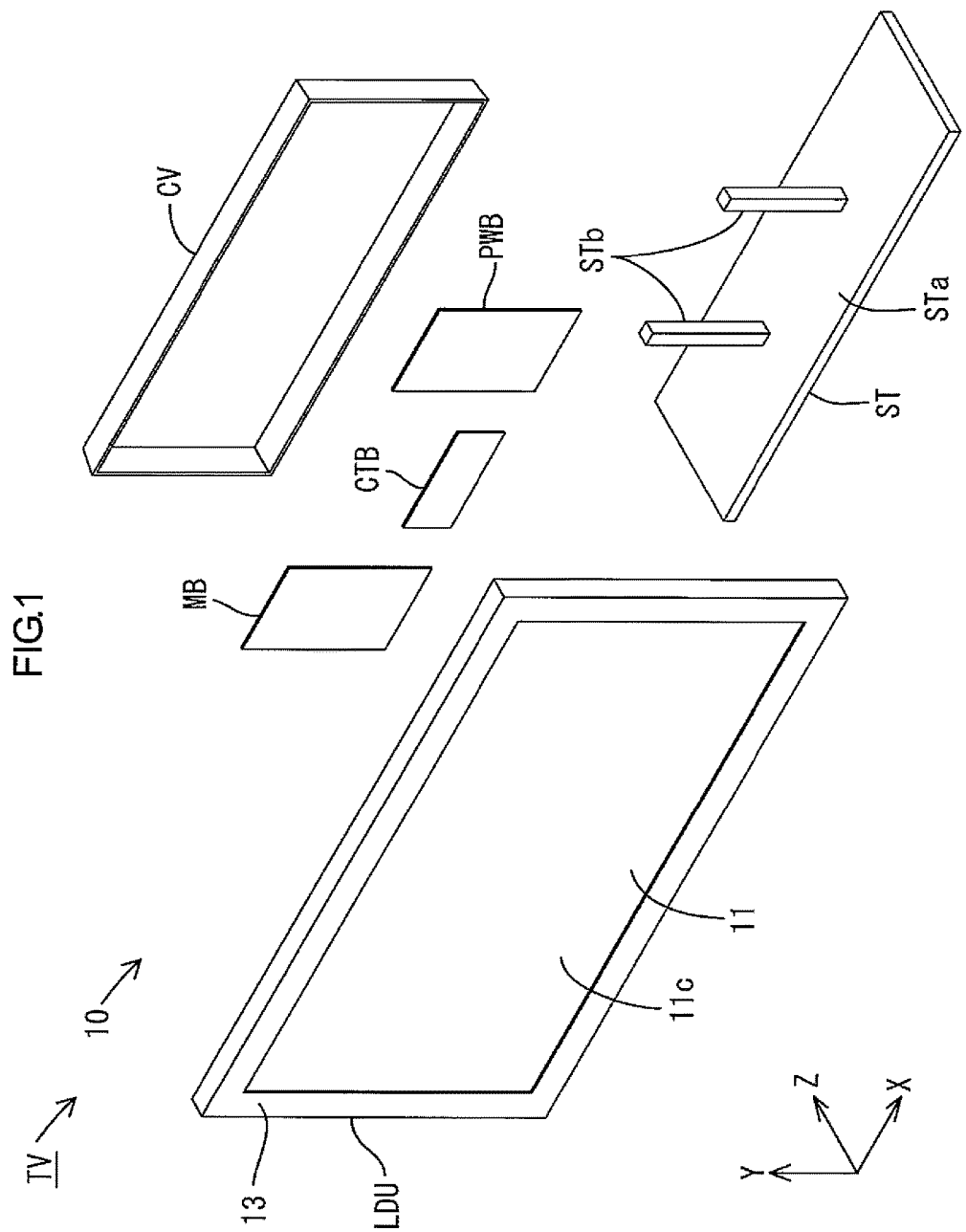
FIG. 1 is an exploded perspective view of a general configuration of a television device TV according to a first embodiment.
Figure 2:
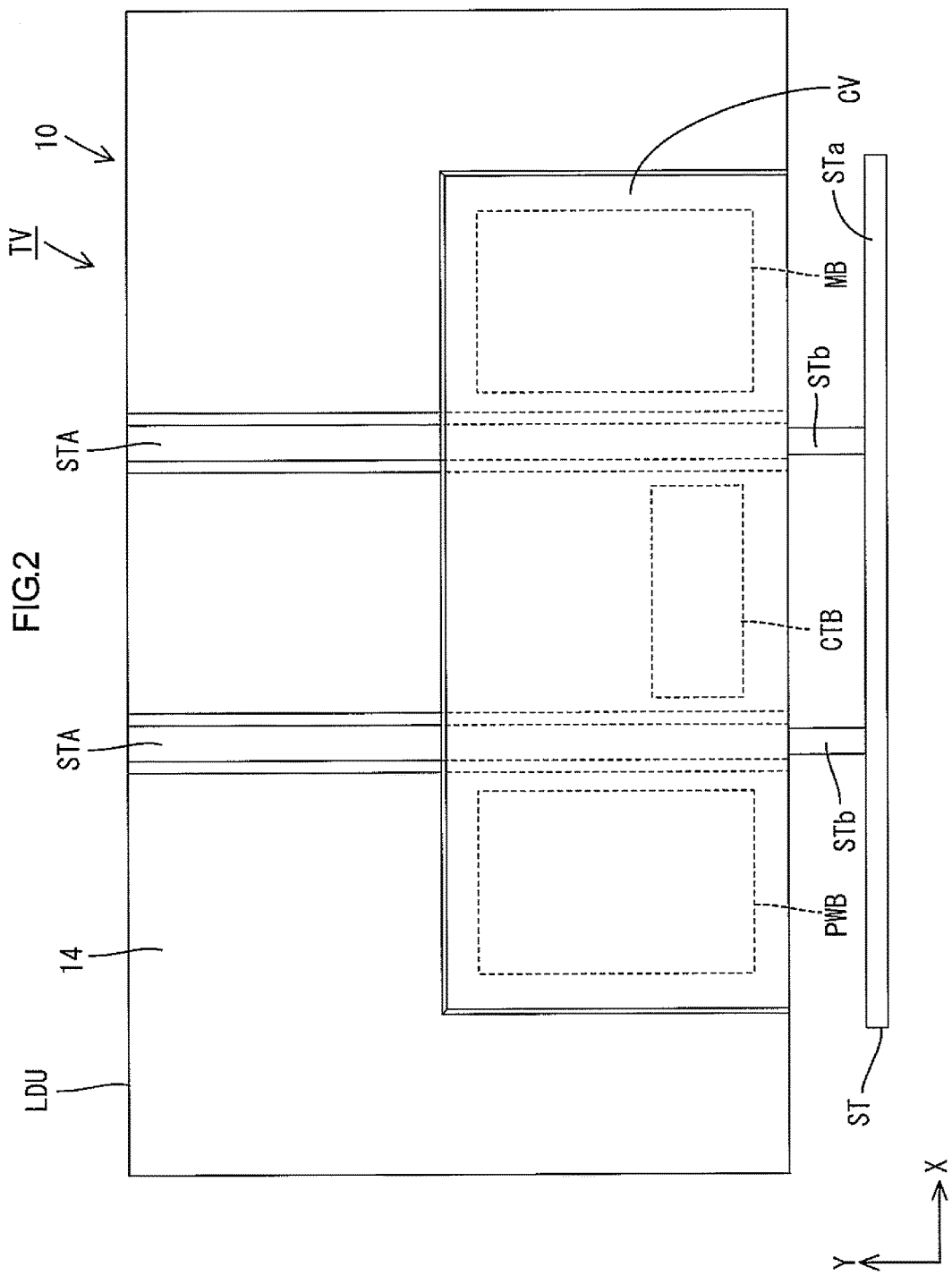
FIG. 2 is a rear view of the television device TV.

FIG. 1 is an exploded perspective view of a general configuration of the television device TV according to the first embodiment of the present invention. FIG. 2 is a rear view of the television device TV. As illustrated in FIG. 1, the television device TV according to this embodiment includes a liquid crystal display unit LDU, boards PWB, MB, and CTB, a cover CV, and a stand ST. The boards PWB, MB, and CTB are attached to the rear side (a rear-surface side) of the liquid crystal display unit LDU. The cover CV is attached to the rear side of the liquid crystal display unit LDU so as to cover the boards PWB, MB, and CTB. The stand ST holds the liquid crystal display unit LDU such that a display surface 11c of the liquid crystal display unit LDU extends in the vertical direction (the Y-axis direction).

The liquid crystal display device 10 according to this embodiment has the same configuration as the above-described television device TV except for at least a component for receiving television signals (e.g. a tuner included in a main board MB). The liquid crystal display unit LDU has a landscape rectangular overall shape (rectangular and longitudinal). The liquid crystal display unit LDU includes a liquid crystal panel 11 as a display panel and a backlight device (a lighting device) 12 as an external light source. The liquid crystal panel 11 and the backlight device 12 are collectively held by a frame 13 and a chassis 14. The frame 13 and the chassis 14 provide an external configuration of the liquid crystal display device 10.

As illustrated in FIG. 2, two stand fitting members STA are attached to the rear surface of the chassis 14 that provides an external configuration of the back of the liquid crystal display device 10. The stand fitting members STA are spaced away from each other in an X-axis direction and extend along the Y-axis direction. Each stand fitting member STA has across section that corresponds to a cross section of a channel beam and opens to the chassis 14. A space is provided between the stand fitting member STA and the chassis 14. Support portions STb included in the stand ST are inserted in the respective spaces between the stand fitting members STA and the chassis 14. Wiring members (e.g. electric wires) which are connected to an LED board 18 included in the backlight device 12 are passed through the space provided in the stand fitting member STA. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand fitting members STA in the X-axis direction. A component storage space is provided between the cover CV and the chassis 14 such that the boards PWB, MB, and CTB, which will be described next, are arranged therein.

As illustrated in FIG. 2, a power source board PWB, a main board MB, and a control board CTB are included as the boards PWB, MB, and CTB. The power source board PWB will be referred to as a power supply of the liquid crystal display device 10 and supplies drive power to the other boards MB and CTB and LEDs 17 included in the backlight device 12. The main board MB includes at least a tuner and an image processor, which are not illustrated. The tuner is configured to receive television signals. The image processor performs image processing on the received television signals. The main board MB is configured to output the processed image signals to the control board CTB. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which is sent from the main board, to driving signals for liquid crystals and to supply the driving signals to the liquid crystal panel 11.

Figure 3:
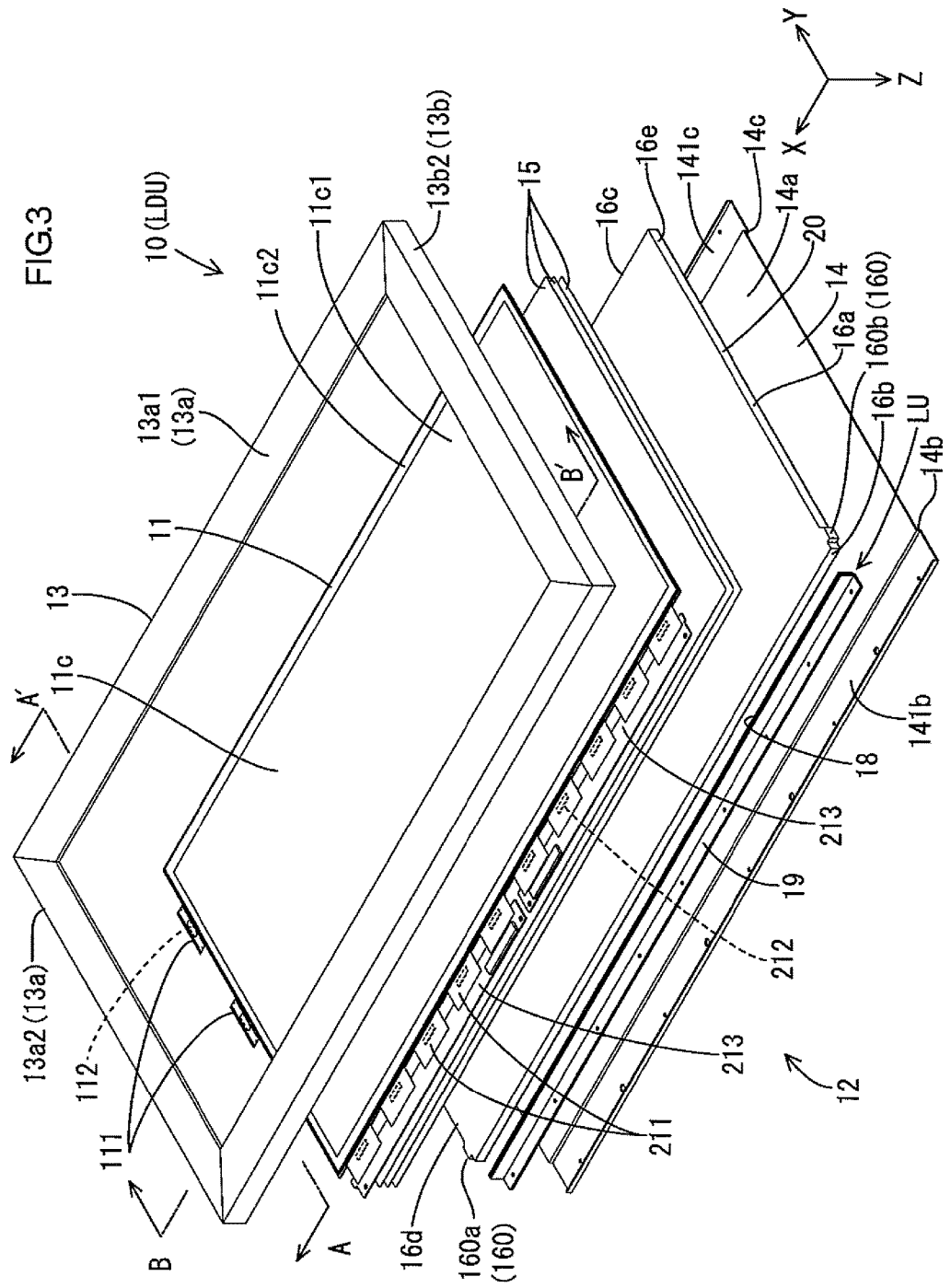
FIG. 3 is an exploded perspective view of a general configuration of a liquid crystal display unit LDU of a liquid crystal display device.
Figure 4:
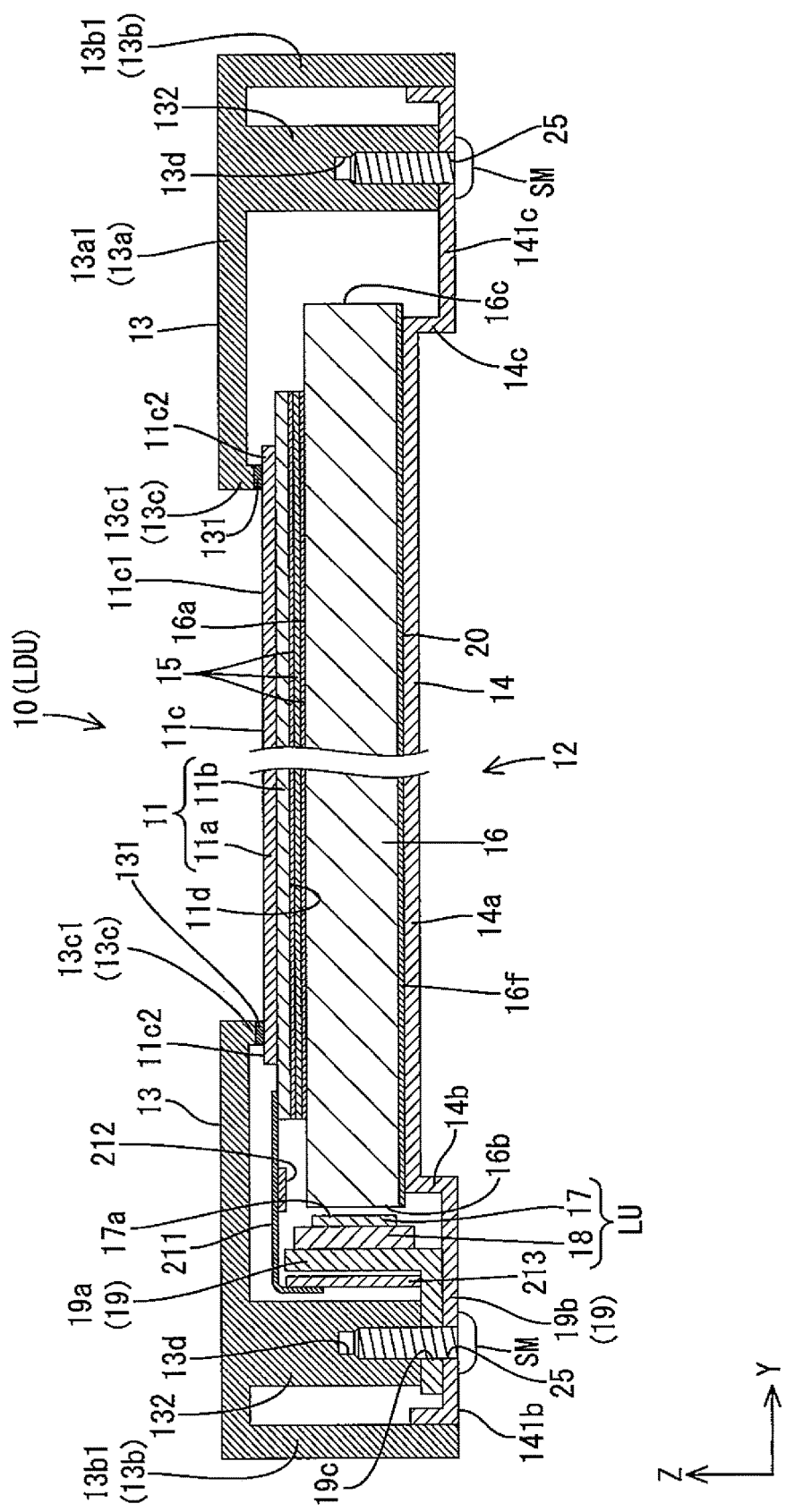
FIG. 4 is a cross-sectional view of the liquid crystal display device taken along line A-A'.
Figure 5:
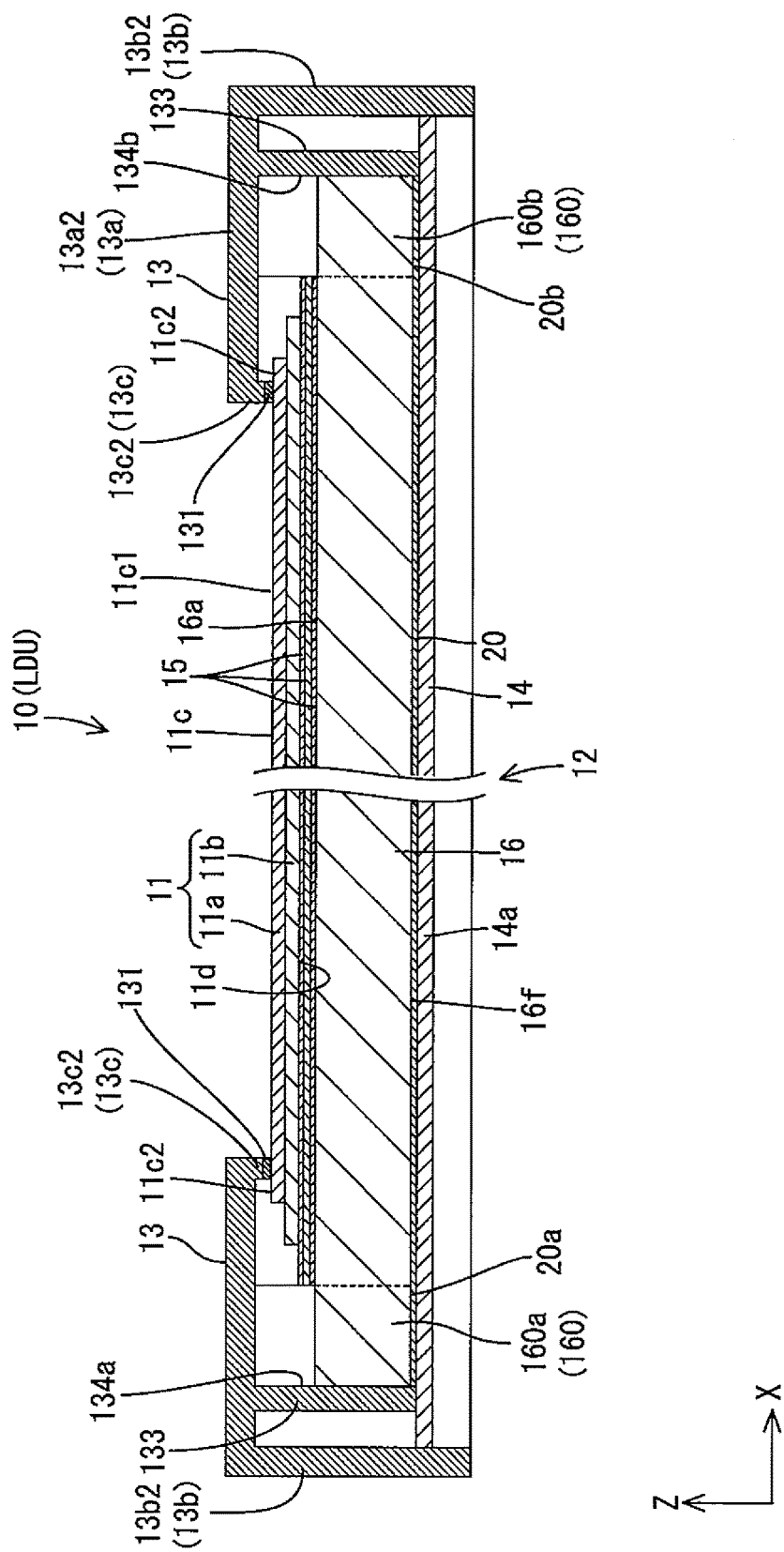
FIG. 5 is a cross-sectional view of the liquid crystal display device taken along line B-B'.

FIG. 3 is an exploded perspective view of a general configuration of a liquid crystal display unit LDU of the liquid crystal display device. FIG. 4 is a cross-sectional view of the liquid crystal display device 10 taken along line A-A', and FIG. 5 is a cross-sectional view of the liquid crystal display device 10 taken along line B-B'. As illustrated in FIGS. 3 to 5, components of the liquid crystal display unit LDU included in the liquid crystal display device 10 are arranged in a space provided between the frame (a front frame) 13 that is arranged on a front side and the chassis (a rear chassis) 14 that is arranged on a rear side. The components arranged between the frame 13 and the chassis 14 are at least the liquid crystal panel 11, an optical member 15, a light guide plate 16, a LED unit (a light source unit) LU, a light source support member 19, and a reflection sheet 20. The liquid crystal panel 11, the optical member 15, the light guide plate 16 and the reflection sheet 20 are placed on top of one another and held between the frame 13 on the front side and the chassis 14 on the rear side. The backlight device 12 includes the optical member 15, the light guide plate 16, the LED unit LU, the light source support member, the chassis 14, and the reflection sheet 20. The LED unit LU is arranged in the space between the frame 13 and the chassis 14 and parallel to a long-side surface 16b of the light guide plate 16. The LED unit LU includes LEDs (LED light sources) 17 as light sources, and the LED board (a light source board) 18 where the LEDs 17 are mounted. The LED unit LU is used with being held with the light source support member (a heat dissipation member) 19.

As illustrated in FIG. 3, the liquid crystal panel has a landscape rectangular shape (rectangular and longitudinal) in a plan view and includes a pair of glass substrates 11a and 11b and liquid crystals. The substrates 11a and 11b having high light transmissivity are bonded together with a predetermined gap therebetween. The liquid crystals are sealed between the substrates 11a and 11b. A front-side one of the substrates 11a, 11b (on a display-surface 11c side) is a color filter (hereinafter, referred to as CF) substrate 11a, and a rear-side one of the substrates 11a, 11b (on a rear-surface 11d side) is an array substrate 11b. On the array substrate 11b, switching elements (e.g. thin-film transistors: TFTs), pixel electrodes, and an alignment film are arranged. The switching elements are connected to gate lines and source lines that are arranged perpendicular to each other. The pixel electrodes are connected to the switching elements. Specifically, a number of the TFTs and the pixel electrodes are arranged on the array substrate 11b and a number of the gate lines and the source lines are arranged in a matrix so as to surround the TFTs and the pixel electrodes. The gate lines and the source lines are connected to gate electrodes and electrodes of the respective TFTs. The pixel electrodes are connected to drain electrodes of the respective TFTs. Furthermore, capacitive lines (auxiliary capacitive lines, storage capacitive lines, Cs lines) are arranged parallel to the gate lines and over the pixel electrode in a plan view. The capacitive lines and the gate lines are alternately arranged in the Y-axis direction. On the CF substrate 11a, color filters and a black matrix (hereinafter referred to as BM) are arranged. The color filters include red (R), green (G), and blue (B) color portions that are arranged in a predetermined arrangement. The BM has alight blocking property and is formed in a matrix shape to define each of the CFs. A counter electrode, and an alignment film are arranged to cover each of the CFs and the BM. Polarizing plates, which are not illustrated, are arranged on outer sides of the substrates 11a and 11b.

As illustrated in FIGS. 4 and 5, the array board 11b of the substrates 11a and 11b of the liquid crystal panel 11 has a larger size in a plan view than the CF board 11a. Therefore, peripheral edges of the array board 11*b* are located farther out than peripheral edges of the CF board 11*a*. Specifically, the array board 11*b* is slightly larger than the CF board 11*a* such that the entire peripheral edges of the array board 11*a* are farther out than the peripheral edges of the CF board 11*a*. Outer peripheral edges of the array substrate 11*b* include long-side peripheral edges. Source-side terminals, which are not described, are arranged at one of the long-side peripheral edges on a control bard CTB side (the front side in FIG. 3, the left side in FIG. 4) with respect to the Y-axis direction. The source-side terminals are connected to the source lines. As illustrated in FIG. 3, each of the source-side terminals is connected to a flexible board 211. The flexible circuit boards 211 are arranged at certain intervals along the X-axis direction, that is, the long-side peripheral edge of the array board 11*b*. Each flexible circuit board 211 extends outward (in the Y-axis direction) from the long-side peripheral edge of the array board 11*b*.

Outer peripheral edges of the array substrate 11*b* include short-side peripheral edges. Gate-side terminals, which are not illustrated, are arranged at one of the short-side peripheral edges of the array board 11*b* (the left side in FIG. 3). Gate-side terminals, which are not illustrated, are connected to the gate lines and the capacitive lines. The gate-side terminals are connected to flexible boards 111. The flexible boards 111 are arranged at certain intervals in the Y-axis direction (along the short-side peripheral edge of the array substrate 11*b*). Each of the flexible boards 111 extends outward (in the X-axis direction) from the short-side peripheral edge of the array board 11*b*.

Each of the source-side flexible boards 211 includes a film-like base member and a source driver (IC chip) 212 mounted on the base member. The base member is made of synthetic resin having insulating properties and flexibility (e.g., a resin containing polyimide). The source driver 212 is for driving liquid crystals. The source driver 212 is arranged on a rear side of each flexible board 211 (FIGS. 3 and 4). A number of traces (not illustrated) are formed on the base member of the flexible board 211 and connected to the source driver 212 mounted at about the center of the base member. Each trace is made of a metal film such as copper foil and is a conductive path. The traces are formed on the base member of the flexible board 211 with using known technologies.

In this embodiment, the flexible board 211 where the driver 212 is mounted is made of a SOF (System on Film). Each flexible board 211 is connected to the source-side terminal of the array substrate 11*b* atone end and thereof by pressure bonding via an anisotropic conductive film (ACF). Each flexible board 211 is connected to a terminal (not illustrated) of the source-side printed board (a source board) 213 by pressure bonding via an anisotropic conductive film (ACF). The printed circuit board 213 is electrically connected to the array substrate 11*b* (the liquid crystal panel 11) via the flexible board 211. The printed circuit board 27 (a source board) 213 is connected to the control board CTB via a wiring member (e.g., an FPC: flexible printed circuit board), which is not illustrated. The printed circuit board 213 is configured to transmit signals input from the control circuit board CTB (scan signals to the gate lines, data signals to the source lines, capacitive signals to the capacitive lines) to the liquid crystal panel 11 side via the flexible circuit boards 211. The printed circuit board 213 has an elongated shape (a belt-like shape). In this embodiment, two printed circuit boards 213 are used and they are linearly arranged to be connected to the respective flexible boards 211. A longitudinal length of the printed circuit board 213 is approximately a half of the long side of the liquid crystal panel 11. A short-side length of the printed circuit board 213 is greater than a thickness (a length of the light guide plate 16 in the Z-axis direction) of the light guide plate 16 due to the traces formed on the printed circuit board 213.

The gate-side flexible board 111 is connected to the gate-side terminal of the array substrate 11*b* at one peripheral end thereof by pressure bonding via an anisotropic conductive film (ACF). The flexible board 111 is made of an SOF similar to the source-side flexible board 211. A gate driver (IC chip) 112 is mounted on the flexible board 111. The gate driver 112 is arranged on a rear side (FIG. 3) of the flexible board 111. Relay lines, which are not illustrated, are arranged on the array substrate 11*b* to connect the source-side terminals and the gate-side terminals. Signals input from the control circuit board CTB (scan signals to the gate lines, capacitive signals to the capacitive lines) are transmit to the gate-side terminals and the flexible boars 111 via the relay lines. With such a configuration, images appear on the display surface 11*c* of the liquid crystal panel 11 based on the signals input from the control circuit board CTB.

As illustrated in FIGS. 3 to 5, the liquid crystal panel 11 is placed on a front side (a light exit side) of the optical member 15, which will be described later. A rear-side surface of the liquid crystal panel 11 (a rear surface 11*d*) is fitted to the optical member 15 with minimal gaps therebetween. Therefore, dust is less likely to enter a space between the liquid crystal panel 11 and the optical member 15. The liquid crystal panel 11 includes a display surface (a front side surface) 11*c*. The display surface 11*c* includes a display area 11*c*1 having a square shape and a non-display area 11*c*2 having a frame-like shape. The display area 11*c*1 is an inner area of a screen in which images are displayed. The non-display area 11*c*2 is an outer area of the screen around the display area with a frame-like shape. The terminals and the flexible boards 111, 211 are arranged in the non-display area 11*c*2.

As illustrated in FIG. 3, similar to the liquid crystal panel 11, the optical member 15 has a landscape rectangular shape in a plan view and has a size (i.e., a short-side dimension and a long-side dimension) greater than the display area 11*c*1 of the liquid crystal panel 11. The optical member 15 has a substantially same size as the whole liquid crystal panel 11. The optical member 15 is placed on the front side of the light guide plate 16 (a light exit side), which will be described later, and sandwiched between the light guide plate 16 and the liquid crystal panel 11. The optical member 15 has a size so as to be arranged within an area of a front plate surface 16*a* of the light guide plate 16. The optical member 15 includes three sheets that are placed on top of one another. Specifically, a diffuser sheet, a lens sheet, and a reflecting type polarizing sheet are selectively used as examples of the optical member 15. Light exiting from the light guide plate 16 through the front side plate surface (a light exit surface) 16*a* passes through the optical member 15 toward the rear surface 11*d* of the liquid crystal panel.

The light guide plate 16 is made of substantially transparent (high transmissivity) synthetic resin (e.g. acrylic resin or polycarbonate such as PMMA) which has a refractive index sufficiently higher than that of the air. As illustrated in FIG. 3, the light guide plate 16 has a landscape rectangular shape in a plan view similar to the liquid crystal panel 11 and the optical member 15. A thickness of the light guide plate 16 is larger than a thickness of the optical member 15. A long-side direction and a short-side direction of a main surface (a plate surface 16*a*, 16*f*) of the light guide plate 16 correspond to the X-axis direction and the Y-axis direction, respectively. A thickness direction of the light guide plate 16 that is perpendicular to the main surface (the plate surface 16a, 16f) of the light guide plate 16 corresponds to the Z-axis direction. The light guide plate 16 has a front view size (a short-side dimension and a long-side dimension) greater than the liquid crystal panel 11. The light guide plate 16 is arranged within the display device 10 such that edge thereof protrudes over edge of the liquid crystal panel 11.

The light guide plate 16 is slightly greater in size than the liquid crystal panel 11 such that edge thereof protrude over outer peripheral edge of the array substrate 11b of the liquid crystal panel 11. The light guide plate 16 is arranged on the rear side of the optical member 15 and sandwiched between the optical member 15 and the chassis 14. The LED unit LU held with the light source support member 19 is arranged on an outer side of a long-side edge surface 16b of the light guide plate 16. Light from the LED unit LU enters the light guide plate 16 through the edge surface 16b. The light guide plate 16 is configured to guide the light, which is from the LED unit LU and enters the light guide plate 16 through the edge surface 16b, toward the optical member 15 (on the front side).

One of the plate surfaces of the light guide plate 16 facing the front side (a surface opposite the optical member 15) is a light exit surface 16a. Light exits the light guide plate 16 through the light exit surface 16a toward the optical member 15 and the liquid crystal panel 11. The light guide plate 16 includes outer peripheral edge surfaces that are adjacent to the main surface (a plate surface 16a) of the light guide plate 16. One of the outer peripheral edge surfaces is a long-side edge surface 16b that has an elongated shape along the X-axis direction. The long-side edge surface 16b is opposite the LEDs 17 (the LED board 18) with a predetermined space therebetween and is a light entrance surface 16b through which light from LEDs 17 enters. The light entrance surface 16b is parallel to a X-Z plane (a main surface of the LED board 18) and is substantially perpendicular to the light exit surface 16a. Among the outer peripheral edge surfaces of the light guide plate 16, short-side edge surfaces 16d, 16e having the short dimension are parallel to a Y-Z plane and substantially perpendicular to the light entrance surface 16b and the light exit surface 16a. In this specification, the short-side edge surfaces 16d, 16e among the edge surfaces of the light guide plate 16 may be referred to as side edge surfaces 16d, 16e. As illustrated in FIG. 4, the side edge surfaces 16d, 16e of the light guide plate 16 are on an outer side than the edges of the liquid crystal panel 11.

Each of the side edge surfaces 16d, 16e of the light guide plate 16 includes a positioning projection portion 160 (160a, 160b). The side edge surface 16d includes the positioning projection portion 160a that protrudes outwardly. The side edge surface 16d extends in the short-side direction (the Y-axis direction) of the light guide plate 16 and includes the positioning projection portion 160a close to the light entrance surface 16b. In this embodiment, the positioning projection portion 160a is near the light entrance surface 16b. The positioning projection portion 160a has a trapezoidal shape protruding outwardly from the side edge surface 16d and having apart of edge surfaces being inclined with a front-side plan view of the light guide plate 16.

The other side edge surface 16e includes the positioning projection portion 160b protruding outwardly. Similar to the positioning projection portion 160a, the side edge surface 16e includes the positioning projection portion 160b close to the light entrance surface 16b. In this embodiment, the positioning projection portion 160b is near the light entrance surface 16b. The positioning projection portion 160b has a trapezoidal shape protruding outwardly from the side edge surface 16e and having a part of edge surfaces being inclined with a front-side plan view of the light guide plate 16a. In this embodiment, the light guide plate 16 includes the positioning projection portion 160a and the positioning projection portion 160b symmetrically with respect to the light exit surface 16a with its front-side plan view. Namely, the light guide plate 16 includes the positioning projection portions 160a, 160b on the same position in the short dimension (the Y-axis dimension) thereof.

The light guide plate 16 integrally includes the positioning projection portion 160 with other part thereof (hereinafter, referred to as a main body) and the positioning projection portion 160 is made of a same material as the main body. Therefore, the positioning projection portion 160 has refractive index equal to that of the main body of the light guide plate 16. The light guide plate 160 including the positioning projection portion 160 may be manufactured by cutting a certain plate member or by molding a resin material with a predetermined die. A specific configuration of the positioning projection portion 160 will be described later.

The reflection sheet 20 is arranged on the rear side of the light guide plate 16 (namely, on the rear side of the main body of the light guide plate 16). The reflection sheet 20 is configured to reflect the light travelling within the light guide plate 16 toward the light exit surface 16. The reflection sheet 20 is arranged to cover an entire area of the rear-side plate surface 16c of the light guide plate 16. The reflection sheet 20 is arranged so as to be sandwiched between the chassis 14 and the light guide plate 16 within the display device 12. The reflection sheet 20 is made of synthetic resin and has a white surface having high light reflectivity (for example, foamed polyethylene terephthalate sheet). In this embodiment, the reflection sheet 20 includes projected portions 20a, 20b on short-side edges thereof. The projected portions 20a, 20b are provided on respective lower surfaces of the positioning projection portions 160 (see FIG. 5).

A reflection portion or a scattering portion, which is not illustrated, is provided and patterned on at least one of the light exit surface 16a and the rear-side plate surface 16f of the light guide plate 16 so as to have a predetermined in-plane distribution. The reflection portion is configured to reflect light within the light guide plate 16 and the scattering portion is configured to scatter light within the light guide plate 16. With this configuration, the light exiting the light guide plate 16 through the light exit surface 16a has an even distribution within a plane.

Next, the LEDs 17 and the LED board 18 included in the LED unit LU will be described. As illustrated in FIGS. 3 and 4, each light emitting diode (LED) 17 includes an LED chip arranged on aboard that is fixed on the LED board 18 and sealed with resin. The LED 17 emits white light. The LED chip mounted on the board has one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Thus, overall color of light emitted from the LED 17 is white. The phosphors may be selected, as appropriate, from yellow phosphors that emit yellow light, green phosphors that emit green light, and red phosphors that emit red light. The phosphors may be used in combination of the above phosphors or one of the phosphors may be selectively used. The LED 17 includes a main light-emitting surface 17a that is opposite the surface that is mounted on the LED board 18 (a surface opposite to the light entrance surfaces 16b of the light guide plate 16). Namely, the LED 17 is a so-called top-surface-emitting type LED.

According to this embodiment, the light source (LED) has a light distribution according to the Lambertian distribution. The light distribution of light emitted from the light source (LED) 17 follows the Lambertian distribution. Therefore, as the light is angled at a greater angle with respect to the optical axis of light having highest light emission strength, the light emission strength tends to be lowered with a curved line.

As illustrated in FIGS. 3 and 4, the LED board 18 has an elongated plate-like (a belt-like) shape and extends in the long-side direction of the light guide plate 16 (the X-axis direction, the long-side direction of the light entrance surface 16b). The LED board 18 is arranged in the frame 13 and the chassis 14 such that a plate surface thereof is parallel to the X-Z plane, that is, parallel to the light entrance surface 16b of the light guide plate 16. The LED board 18 has a long-side dimension that is about same as the long-side dimension of the light guide plate 16. The LED board 18 includes a plate surface (a mount surface) that faces the light guide plate 16 and the LEDs 17 are surface-mounted on the mount surface. The LEDs 17 are arranged in a row (i.e., linearly) at intervals on the mount surface of the LED board 18 along the long-side direction of the LED board 18 (the X-axis direction). Distances between the adjacent LEDs 17 in the X-axis direction are substantially equal, that is, the LEDs 17 are arranged at substantially equal intervals. An arrangement direction of the LEDs 17 corresponds to the longitudinal direction of the LED board 18 (the X-axis direction). The LEDs 17 arranged in a row may be referred to as a LED row (a light source row) in this specification.

A Metal-film trace (not illustrated), such as copper-foil trace, is formed on the mount surface of the LED board 18. The metal-film trace extends in the longitudinal direction of the LED board 18 (the X-axis direction) and crosses over each of the LEDs 17 so as to connect the adjacent LEDs 17 in series. Terminals at ends of the trace are electrically connected to the power source board PWB via wiring members including connectors and electric wires. Thus, driving power is supplied to the LEDs 17. The main light-emitting surface 17a of each of the LEDs 17 mounted on the LED board 18 is opposed to the light entrance surface 16b of the light guide plate 16 and an optical axis of light from each LED 17 substantially matches the Y-axis direction. The base board of the LED board 18 is made of metal such as aluminum and the metal-film trace (not illustrated) is formed on the surface of the base board via an insulation layer. A white solder mask film (not illustrated) is formed on the insulation layer to cover the metal-film trace. The base board of the LED board 18 may be made of an insulation material such as ceramics.

As illustrated in FIGS. 3 and 4, the light source support member (heat dissipation member) 19 is made of metal having high thermal conductivity, such as aluminum. The light source support member 19 includes a LED mount portion (a light source mount portion) 19a and a heat dissipation portion 19b. The LED board 18 is attached to the LED mount portion 19a. The heat dissipation portion 19b is in surface-contact with a plate surface of the chassis 14. The LED mount portion 19a and the heat dissipation portion 19b form an angle therebetween so as to have an L-like shape in a cross-section. The light source support member 19 has a long dimension substantially equal to the long dimension of the LED board 18. The LED mount portion 19a has a plate-like shape parallel to the plate surface of the LED board 18 and the light entrance surface 16b of the light guide plate 16. A long-side direction, a short-side direction, and a thickness direction of the LED mount portion 19a match the X-axis direction, the Z-axis direction, and the Y-axis direction, respectively. The LED board 18 is mounted on an inner surface of the LED mount portion 19a, which is a plate surface that faces the light guide plate 16. While the LED mount portion 19a has a long dimension that is substantially equal to the long dimension of the LED board 18, a short dimension of the LED mount portion 19a is greater than a short dimension of the LED board 18.

An outer plate surface of the LED mount portion 19a, which is a plate surface opposite from the plate surface on which the LED board 18 is attached, faces an inner wall 132 of the frame 13, which will be described later. The LED mount portion 19a is located between the inner wall 132 of the frame 13 and the light guide plate 16 within the display device 12. The LED mount portion 19a projects from an inner end of the heat dissipation portion 19b, which is an end of the heat dissipation portion 19b close to the LEDs 17 (the light guide plate 16), in the Z-axis direction (a direction in which the liquid crystal panel 11, optical member 15, and the light guide plate 16 overlap each other) toward the front side, that is, toward the frame 13. A small space is provided between the LED mount portion 19a and the inner wall 132 and the source-side printed circuit board 213 is arranged in the space.

As illustrated in FIGS. 3 and 4, the heat dissipation portion 19b has a plate-like shape and is parallel to the plate surface of the chassis 14. A long-side direction, a short-side direction, and a thickness direction of the heat dissipation portion 19b match the X-axis direction, the Y-axis direction, and the Z-axis direction, respectively. The heat dissipation portion 19b extends from a rear-side (lower) end of the LED mount portion 19a toward the outer side in the Y-axis direction. In other words, the heat dissipation portion 19b extends from an end portion of the LED mount portion 19a closer to the chassis 14 toward the outer side in an opposite direction from the light guide plate 16. The heat dissipation portion 19b has a long dimension substantially equal to the long-side dimension of the LED mount portion 19a. An entire rear (lower) plate surface of the heat dissipation 19b, which is a plate surface of the heat dissipation portion 19b facing the chassis 14, is in surface-contact with the plate surface of the chassis 14. A front (upper) plate surface of the heat dissipation portion 19b, which is a plate surface opposite from the surface in contact with the chassis 14, is in contact with a lower end surface of the inner wall 132 of the frame 13. The heat dissipation portion 19b is sandwiched between the inner wall 132 of the frame 13 and the chassis 14. With this configuration, heat generated from the LEDs 17 as they are turned on is transferred to the chassis 14 and the frame 13 including the inner wall 132 via the LED board 18, the LED mount portion 19a, and the heat dissipation portion 19b. Therefore, heat from the LEDs 17 is effectively released to the outside of the liquid crystal display device 10 and thus the heat is less likely to stay within the device. The heat dissipation portion 19b includes through holes 19c through which screw members SM are passed. The heat dissipation portion 19b is fixed to the inner wall 132 of the frame 13 with the screw members SM.

Next, configurations of the frame 13 and the chassis 14 will be described. The frame 13 and the chassis 14 are made of metal such as aluminum and have high mechanical strength (rigidity) and high thermal conductivity. The frame 13 and the chassis 14 hold the LED unit LU at ends of the short dimension of the frame 13 and the chassis 14 (at the respective long sides). The LED unit LU is arranged in the frame and the chassis 14 and the frame 13 and the chassis 14 hold the liquid crystal panel 11, the optical member 15, the light guide plate 16, and the reflection sheet 20, which are placed on top of the other, from the front side and the rear side.

As illustrated in FIGS. 3 to 5, the frame 13 has a landscape rectangular shape so as to surround the display area 11c1 in the display surface 11c of the liquid crystal panel 11. The frame 13 includes an opposed portion 13a, an outer wall 13b, a contact portion 13c, and inner walls 132, 133. The opposed portion 13a is formed in a frame-like shape and disposed on the front side of the liquid crystal panel 11. The outer wall 13b protrudes from an outer peripheral portion of the opposed portion 13a toward the chassis 14. The contact portion 13c protrudes from an inner peripheral portion of the opposed portion 13a toward the liquid crystal panel 11 and is in contact with the non-display area 11c2 in the peripheral edge portion of the display area 11c1. The inner wall 132, 133 is disposed between the outer wall 13b and the contact portion 13c and protrudes from the opposed portion 13a toward the chassis 14.

The opposed portion 13a includes long-side opposed portions 13a1 that are on the long sides of frame 13 and short-side opposed portions 13a2 that are on the short sides of the frame 13. The outer wall 13b includes long-side outer walls 13b1 that are on the long sides of the frame 13 and short-side outer walls 13b2 that are on the short sides of the frame 13. The contact portion 13c includes long-side contact portions 13c1 that are on the long sides of the frame 13 and short-side contact portions 13c2 that are on the short sides of the frame 13. The inner walls 132 are provided on the respective long-side opposed portions 13a1 and the inner walls 133 are provided on the respective short-side opposed portions 13a2. One of the two long-side portions of the frame 13 is configured to fix the LED unit LU. However, the long-side portions of the frame 13 have same basic configurations and the short-side portions of the frame 13 have same basic configurations.

The opposed portion 13a is on the front side of the liquid crystal panel 11 so as to cover the non-display area 11c2 in the display surface 11c. The long-side opposed portions 13a1 and the short-side opposed portions 13a2 form a plate-like shape as a whole having a predetermined thickness and parallel to a plate surface of the chassis (a plate surface of the liquid crystal panel 11).

The long-side contact portions 13c1 included in the long-side opposed portions 13a1 press the long-side edge portions of the liquid crystal panel 11 (the non-display area 11c2) from the front side toward the chassis 14 (toward the light guide plate 16). The long-side contact portions 13c1 extend along the long side of the frame 13 (the opposed portion 13a). Distal end portions 131 of the long-side contact portions 13c1 are made of an elastic material having a light blocking property (for example, a black rubber elastic member). The distal end portions 131 of the long-side contact portions 131c1 are in contact with the non-display area 11c2 of the liquid crystal panel 11.

The short-side contact portions 13c2 included in the short-side opposed portions 13a2 press the short-side edge portions of the liquid crystal panel 11 (the non-display area 11c2) from the front side toward the chassis 14 (toward the light guide plate 16). The short-side contact portions 13a2 extend along the short side of the frame 13 (the opposed portion 13a). Distal end portions 131 of the short-side contact portions 13c2 are made of an elastic material having a light blocking property (for example, a black rubber elastic member) similar to the long-side contact portions 13c2. The distal end portions 131 of the short-side contact portions 131c2 are in contact with the non-display area 11c2 of the liquid crystal panel 11. Ends (distal ends) of each short-side contact portion 13c2 included in the short-side opposed portion 13a2 are connected to the respective ends (distal ends) of each long-side contact portion 13c1 included in the long-side opposed portion 13a1. Namely, the contact portion 13c has a frame shape that surrounds the display area 11c1 in the liquid crystal panel 11 as a whole and is in contact with the non-display area 11c2. The contact portion 13c, which is included in the frame 13, is in contact with the non-display area 11c2 provided on the front-side peripheral edge of the liquid crystal panel 11 and holds the overlaid component with the chassis 14.

The outer wall 13b entirely surrounds the liquid crystal panel 11, and the outer wall 13b has a frame-like shape (a shallow shape) that protrudes from the opposed portion 13a toward the chassis 14. The outer wall 13b is disposed at an outer peripheral portion of the opposed portion 13a. The outer wall 13b surrounds the overlaid components including the liquid crystal panel 11, the optical member 15, the light guide plate 16, and the reflection sheet 20 so as to follow an entire periphery (an edge surface) of the overlaid components.

Figure 6:
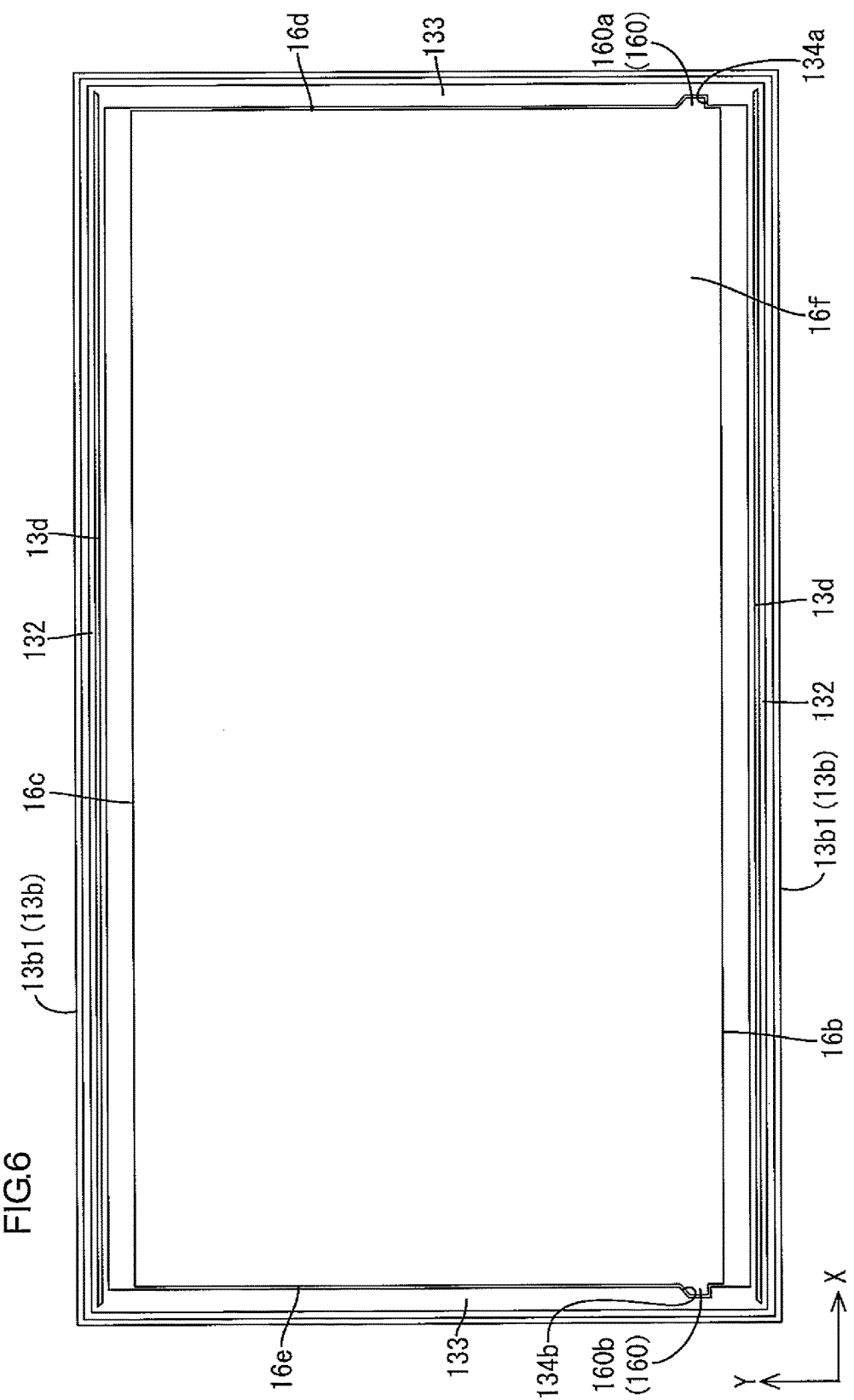
FIG. 6 is a rear-side plan view illustrating positional relation between a frame and the light guide plate.

As illustrated in FIG. 4, the long-side outer walls 13b1 are plates (walls) that protrude straightly from the respective outer peripheral portions of the long-side opposed portions 13a1 downwardly (toward the chassis 14). As illustrated in FIG. 5, the short-side outer walls 13b2 are plates (walls) that protrude straightly from the respective outer peripheral portions of the short-side opposed portions 13a2 downwardly (toward the chassis 14). FIG. 6 is a rear-side view illustrating arrangement relation between the frame 13 and the light guide plate 16. As illustrated in FIG. 6, the outer wall 13b having a square frame shape is arranged at the outer peripheral edge of the frame 13. The long-side inner walls 132 and the short-side inner walls 133 are arranged on an inner side of the outer wall 13b. As illustrated in FIG. 6, the inner walls 132, 133 entirely have a square frame shape surrounding the light guide plate 16.

The short-side inner walls 132 are included in the frame 13 so as to face the side edge surfaces 16d, 16e of the light guide plate 14, respectively. One inner wall 132 that is on an outer side of the side edge surface 16d includes a recess portion 145a where the positioning projection portion 160a is fitted. Another inner wall 132 that is on an outer side of the side edge surface 16e includes a recess portion 134b where the positioning projection portion 160b is fitted. A small gap is provided between the inner walls 132 and the side edge surfaces 16d, 16e, respectively, and the inner wall surfaces 132 and the respective side edge surfaces 16d, 16e are close to each other.

One long-side inner wall 133 is on an outer side of the light entrance surface 16b with a predetermined distance from the light entrance surface 16b. Another inner wall 133 is on an outer side of the edge surface 16c with a predetermined distance from the edge surface 16c. Each of the inner walls 133 includes a groove 13d at its lower end portion. A screw member SM is inserted in and fastened to the groove 13d. The screw members SM are inserted in screw holes 25 in the chassis 14 and the insertion holes 19c in the light source support member 19 and fastened to the grooves 13d, respectively. As a result, the long-side portions of the frame 13 and the chassis 14 are fixed to each other, and the short-side portions of the frame 13 and the chassis 14 are fixed to each other with using screw members, which are not illustrated.

Figure 7:
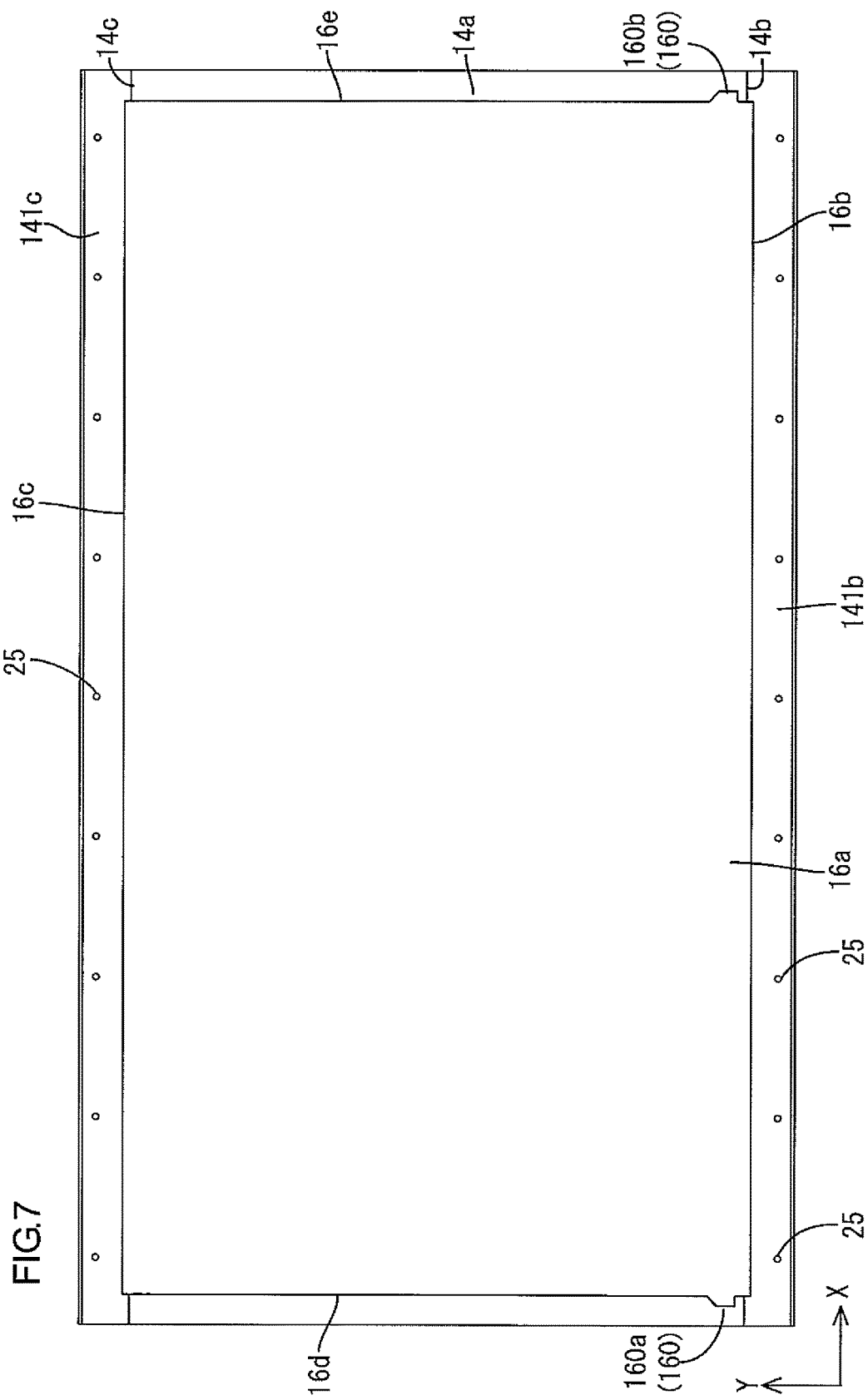
FIG. 7 is a front-side plan view illustrating positional relation between a chassis and the light guide plate.

FIG. 7 is a front-side plan view illustrating arrangement relation between the chassis 14 and the light guide plate 16. The chassis 14 is a plate member having a substantially landscape rectangular shape as a whole similar to the liquid crystal panel 11 and is arranged on a rear surface side of the liquid crystal display unit LDU (the liquid crystal display device 10) so as to cover a rear-side plate surface 16f of the light guide plate 16. The chassis 14 includes a bottom-plate portion 14a, wall portions 14b, 14c, and extended portions 141b, 141c. The bottom-plate portion 14a has a landscape rectangular shape. Each of the wall portions 14b, 14c protrudes from a long-side edge of the bottom-plate portion 14a. The extended portions 141b, 141c extend from the respective wall portions 14b, 14c toward an opposite side from the bottom-plate portion 13a (outwardly). The bottom-plate portion 14a receives the rear-side plate surface 16f of the light guide plate 16 via the reflection sheet 20 and forms a large portion of the chassis 14. The bottom-plate portion 14a is closely in contact with the rear-side plate surface 16f of the light guide plate 16 via the reflection sheet 20.

The wall portions 14b, 14c are included at the respective long-side edges of the bottom-plate portion 14a. The wall portions 14b, 14c is formed of a plate member having a thickness substantially same as the bottom-plate portion 14a. The wall portions 14b, 14c protrude from the long-side edges of the bottom-plate portion 14a so as to be away from the liquid crystal panel 11. The wall portions 14b, 14c have a plate-like shape (a wall shape) extending along the long side of the bottom-plate portion 14a. According to this embodiment, as illustrated in FIG. 4 or other drawings, the wall portions 14b, 14c are disposed on an inner side with respect to the long-side edge surfaces 16b, 16c of the light guide plate 16. The extended portions 141b, 141c extend from the respective wall portions 14b, 14c so as to be away from the bottom-plate portion 14a (outwardly). The extended portions 141b, 141c are formed of a plate member extending along the long side of the bottom-plate portion 14a and having a thickness substantially same as the bottom-plate portion 14a. Each of the extended portions 141b, 141c has an outer peripheral edge that extends upwardly (toward the liquid crystal panel 11) and the outer peripheral extended portions are on an inner side of the respective long-side outer walls 13b1. As illustrated in FIG. 4, the extended portions 141b, 141c are opposed to the respective long-side opposed portions 13a1. The extended portion 141b, 141c is in contact with the heat dissipation portion 19b of the light source support member 19. The extended portion 141b, 141c is opposed to the inner wall 132 via the heat dissipation portion 19b.

Processes of a mounting operation of mounting the components of the liquid crystal display device 10 will be described. First, the frame 13 is placed on a work table such that the front side of the frame 13 faces downward (faces the work table) and the rear side thereof faces upward. Namely, the frame 13 is placed on the work table with being reversed. Next, the liquid crystal panel 11 is mounted on an upper side of the frame 13 (namely, a rear side of the frame 13) placed on the work table such that the CF substrate 11a of the liquid crystal panel 11 faces a lower side (the work table) and the array substrate 11b of the liquid crystal panel 11 faces an upper side. The contact portions 13c of the frame 13 are in contact with the non-display area 11c2 in the liquid crystal panel 11. Next, the optical member 15 is placed on a rear side of the liquid crystal panel 11 (the rear surface 11d side).

Then, the LED unit LU held with the light source support member 29 is mounted on the frame 13. The light guide plate 16 is arranged on the optical member 15 such that the positioning projection portion 160a included in one side edge surface 16d of the light guide plate 16 is fitted into the recess portion 134a in the frame 13 and the positioning projection portion 160b included in the other side edge surface 16e is fitted into the recess portion 134b in the frame 13. On the optical member 15, the front-side surface (the light exit surface) 16a of light guide plate 16 faces a lower side and the rear-side surface 16f faces an upper side. Next, the reflection sheet 20 is mounted on the rear-side surface 16f of the light guide plate 16. Then, the chassis 14 is mounted on the frame 13.

The chassis 14 is fixed to the frame 13 with the screw members SM and the liquid crystal display unit LDU is assembled. Thereafter, the stand fitting member STA and the boards PWB, MB, CTB are mounted on the rear surface of the liquid crystal display unit LDU and the stand ST and the cover CV are mounted on the liquid crystal display unit LDU. Accordingly, the liquid crystal display device 10 and the television device TV according to this embodiment are manufactured.

If the power is turned on the liquid crystal display device 10, power is supplied from the power source board PWB to the control board CTB and signals are transmitted from the control board CTB to the liquid crystal panel 11. Thus, the driving of the liquid crystal panel 11 is controlled and lighting of each of the LEDs 17 included in the backlight device 12 is controlled. If each LED 17 is driven to emit light, the light enters the light guide plate 16 through the light entrance surface 16b. The light entering the light guide plate 16 travels within the light guide plate 16 with reflecting off the reflection sheet 20 arranged on the rear side of the light guide plate 16. The light traveling within the light guide plate 16 exits the light guide plate 16 through the front-side surface (the light exit surface 16a) toward the optical member 15. The light exiting the light guide plate 16 passes through the optical member 15 and spreads substantially evenly to be planar light and the rear surface 11d of the liquid crystal panel 11 is irradiated with the planar light. Images appear in the display area 11c1 of the display surface 11c included in the liquid crystal panel 11 by using the spread planar light.

According to this embodiment, the light guide plate 16 has the positioning projection portions 160a, 160b on the side edge surfaces 16d, 16e, respectively. The positioning projection portions 160a, 160b are provided on portions of the respective side edge surfaces 16d, 16e close to the light entrance surface 16b. The light guide plate 16 is positioned within the liquid crystal display device 10 by using the positioning projection portions 160a, 160b. The positioning projection portions 160a, 160b are on the respective side edge surfaces 16d, 16e close to the light entrance surface 16b, and with this configuration, the light entrance surface 16b is less likely to be in contact with the LEDs 17 included in the LED unit LU when the light guide plate 16 thermally expands, because a length of the light guide plate 16 (a length in the Y-axis direction) between the light entrance surface 16b and each of the positioning projection portions 160a, 160b is very small and the parts of the light guide plate 16 are less likely to thermally expand in the Y-axis direction. Accordingly, the light entrance surface 16 is less likely to be moved to be closer to the LEDs 17. The thermal expansion of the light guide plate 16 mainly moves the edge surface 16c to be closer to the inner wall 132 with the positioning projection portions 160a, 160b as a base. Therefore, in the liquid crystal display device 10 according to this embodiment, a distance between the LEDs 17 and the light entrance surface 16b can be maintained to be small and substantially constant, and it is easy to control the light entrance efficiency of light that is emitted from each LED 17 and enters the light guide plate 16 through the light entrance surface 16b and the light entrance efficiency is improved.

The light guide plate 16 includes the positioning projection portion 160 near the light entrance surface 16b. With such a configuration, light emitted from the LEDs 17 travels into the positioning projection portion 160. Especially, light emitted from the LEDs that are disposed at endmost sides (on positioning projection portion 160 side) (hereinafter endmost light sources) among the LEDs 17 that forma LED row (a light source row) 170 mostly travels into the positioning projection portion 160. If the light travels into the positioning projection portion 160 in the conventional technology, the light may leak from the positioning projection portion and the light leaking from the positioning projection portion may enter the liquid crystal panel through edge portions thereof. This causes uneven linear brightness (like searchlight) on the display surface.

However, in the liquid crystal display device 10 according to this embodiment, even if the light emitted from the LEDs 17 may travel into the positioning projection portion 160, the above-described uneven brightness is less likely to be caused on the display surface 11c of the liquid crystal panel 11. The reasons thereof will be described below with reference to FIGS. 8 to 10 and referring to the light guide plate 16 seen from the front side.

Figure 8:
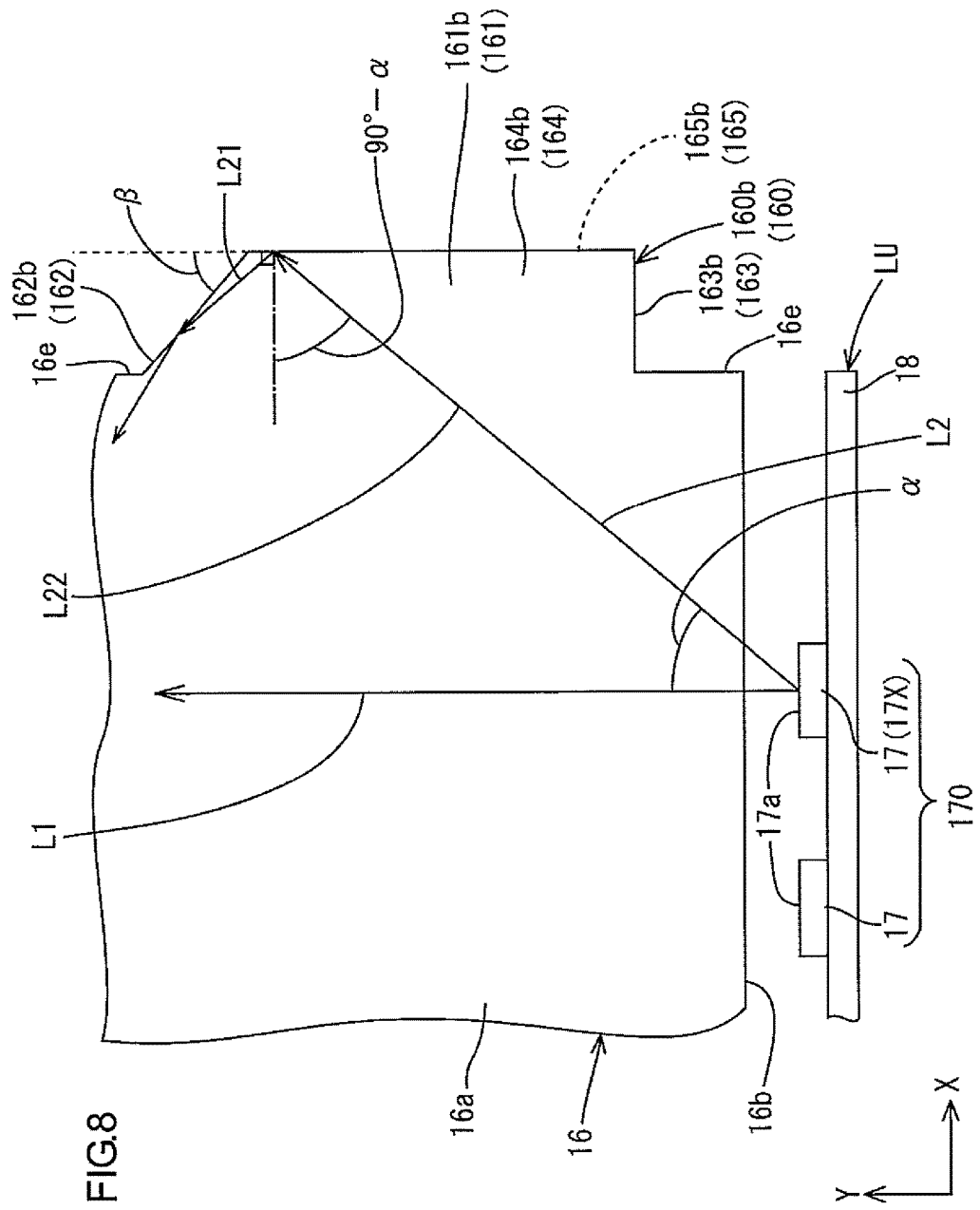
FIG. 8 is a plan view of a positioning projection portion of the light guide plate typically illustrating that light emitted from an endmost light source travels into the positioning projection portion.
Figure 9:
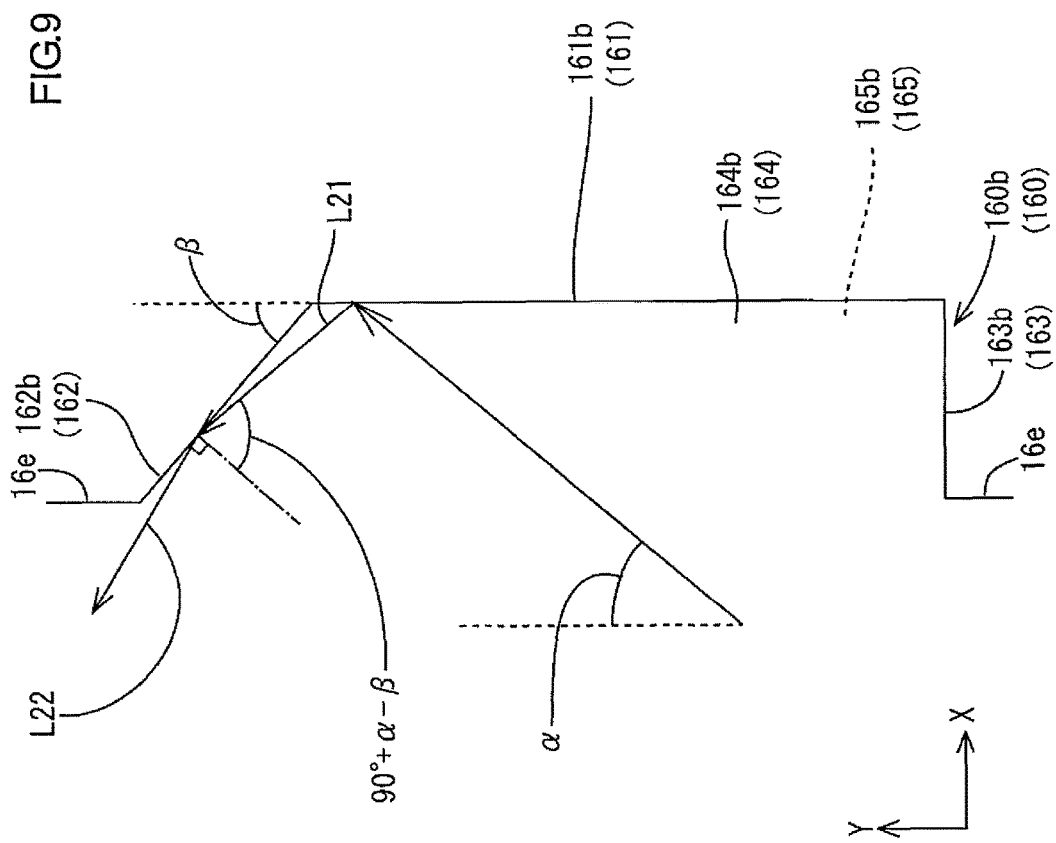
FIG. 9 is an enlarged plan view of FIG. 8.

FIG. 8 is a plan view typically illustrating the positioning projection portion 160b of the light guide plate 16 where light L2 emitted from the endmost light source 17X travels. FIG. 9 is an enlarged plan view of FIG. 8. FIG. 8 typically illustrates a configuration of a portion of the light guide plate 16 including the positioning projection portion 160b. A recess portion 134b where the positioning projection portion 160b is fitted is not described in FIG. 8.

The LED row (a light source row) 170 is mounted on the surface of the LED board 18 to be opposed to the light entrance surface 16b of the light guide plate 16. Among the LEDs 17 included in the LED row 170, the LED 17 arranged on the right endmost side (on a positioning projection portion 160b side) is the endmost light source 17X. As is not illustrated, the LED 17 arranged on the left endmost side (on a positioning projection portion 160a side) is the endmost light source corresponding to the positioning projection portion 160a. Relation between the positioning projection portion 160b and the endmost light source 17X corresponding to the positioning projection portion 160b will be described.

The endmost light source 17X emits light from the main light emission surface 17a toward the light entrance surface 16b. The light having certain directivity spreads three-dimensionally (light having the Lambertian distribution). The light emitted from the endmost light source 17X is mainly directed toward the light entrance surface 16b and enters the light guide plate 16 through the light entrance surface 16b. In FIG. 8, an optical axis of light emitted from the endmost light source 17X is represented by L1. The optical axis L1 is represented as a beam directed straight toward the light entrance surface 16b from a center of the main light emission surface 17a. The optical axis L1 is perpendicular to the light entrance surface 16b and parallel to the side edge surface 16e. The endmost light source 17 is arranged (with respect to the X-axis direction) such that the optical axis L1 crosses at least the light entrance surface 16b of the light guide plate 16 seen from the front side.

FIG. 8 illustrates plan view of the light guide plate 16 seen from the front side. Among rays of light emitted from the endmost light source 17X, a ray of light L2 is directed outwardly (toward the positioning projection portion 16b) at an angle α with respect to the optical axis L1. The angle α is set to be same as a critical angle θc obtained at a border surface between the light guide plate 16 and the outside air. In this embodiment, the light guide plate 16 is made of acrylic resin and the critical angle θc thereof is 42.2°, and therefore, the angle α is 42.2°. The angle α represents an angle formed between the optical axis L1 and the light L2 after the rays of light enter the light guide plate 16. In this specification, the light directed outwardly from the optical axis L1 at an angle α may be referred to as narrow-angle light.

The positioning projection portion 160b is on the side edge surface 16e of the light guide plate 16 such that the narrow-angle light L2 travels thereinto. If the endmost light source 17X is arranged to correspond to the end of the light entrance surface 16b (on the side-end surface 16e side) as is in this embodiment, the narrow-angle light L2 emitted from the endmost light source 17X travels within the light guide plate 16 and travels directly into the positioning projection portion 160b.

As illustrated in FIG. 8, the positioning projection portion 160b includes a first edge surface 161b (161), a second edge surface 162b (162), and a third edge surface 163b (163) at its periphery. The positioning projection portion 160b includes a front surface 164b (164) and a rear surface 165b (165) that are vertical to and adjacent to the edge surfaces 161b, 162b, 163b.

The first edge surface 161b is an outermost edge surface among the peripheral edge surfaces included in the positioning projection portion 160b. The first edge surface 161b is parallel to the side edge surface 16e of the light guide plate 16. The first edge surface 161b is parallel to the optical axis L1 of the endmost light source 17X. The narrow-angle light L2 directly reaches the first edge surface 161b. Namely, with a front-side plan view of the light guide plate 16, a length of the first edge surface 161b (in the Y-axis direction) is set such that the narrow-angle light L2 travelling into the positioning projection portion 160b directly reaches the first edge surface 161b.

The second edge surface 162b is an edge surface arranged between the side edge surface 16e and the first edge surface 161b among the peripheral edge surfaces included in the positioning projection portion 160b. The second edge surface 162b is adjacent to and inclined with respect to the first edge surface 161b and the side edge surface 16e. The second edge surface 162b is an inclined edge surface such that an external angle β formed between the first edge surface 161b and the second edge surface 162b is equal to or smaller than the critical angle θc. An angle (an internal angle) formed between the second edge surface 162b and the first edge surface 16b is always an obtuse angle. The second edge surface 162b is inclined with respect to the light entrance surface 16b. According to this embodiment, the external angle β is set to be same as the critical angle θc.

The third edge surface 163b is an edge surface arranged between the side edge surface 16e of the light guide plate 16 and the first edge surface 161b among the peripheral edge surfaces included in the positioning projection portion 160b similar to the second edge surface 162b. The third edge surface 163b is closer to the light entrance surface 16b than the second edge surface 162b. The third edge surface 163b is not an inclined edge surface like the second edge surface 162b but is parallel to the light entrance surface 16b. According to this embodiment, with a front-side plan view of the light guide plate 16, a length of the third edge surface 163b (a X-axis dimension) is set to be smaller than a length of the first edge surface 161b (a Y-axis dimension). The light emitted from the endmost light source 17X does not directly reach the third edge surface 163b due to the arrangement configuration.

The endmost light source 17X and the positioning projection portion 160b are arranged so as to satisfy the optical conditions, which will be described later. For example, the endmost light source 17X may be positioned with respect to the X-axis direction such that a distance between the side edge surface 16e and the optical axis L1 of the endmost light source 17 is equal to or smaller than the length of the first edge surface 161b with the front-side planar view of the light guide plate 16.

The narrow-angle light L2 is incident on the first edge surface 161b at the angle of 90°−α. Namely, the narrow-angle light L2 is incident on the first edge surface 161b at the critical angle θc or greater, and therefore, the narrow-angle light L2 totally reflects off the first edge surface 161b (refer to FIG. 8). The reflection light L21 that has reflected off the first edge surface 161b is incident on the second edge surface 162b at an angle of 90°+α−β. The relation between the angle α and the external angle β is α≥β, and therefore, the reflection light 21 that is incident on the second edge surface 162b is always equal to or greater than the critical angle θc. Therefore, when the reflection light L21 is incident on the second edge surface 162b, the reflection light L21 always totally reflects off the second edge surface 162b. Accordingly, even if the reflection light L21 of the narrow-angle light L2 is incident on the second edge surface 162b, the reflection light L21 incident on the second edge surface is less likely to leak outside through the second edge surface 162b. Therefore, light is less likely to enter the liquid crystal panel 11 through the edge surface thereof.

According to the external angle β (the inclination angle at which the second edge surface 162b is inclined), the reflection light that is light emitted from the endmost light source 17X and reflecting off the first edge surface 161b may not be incident on the second edge surface 162b and may travel within the positioning projection 160b and return to the main body of the light guide plate 16. In such a case, light is less likely to leak outside from the light guide plate 16 through the second edge surface 162b.

Some of the rays of light emitted from the endmost light source 17X are incident on the first edge surface 161b at an angle smaller than the critical angle θc. The incident light passes through the first edge surface 161b outwardly with refracted by the first edge surface 161b. Even in such a case, the light leaking outwardly through the first edge surface 161b is not directed toward the edge portion of the liquid crystal panel 11, and therefore, the light is less likely to enter the liquid crystal panel 11 through the edge portion thereof.

Figure 10:
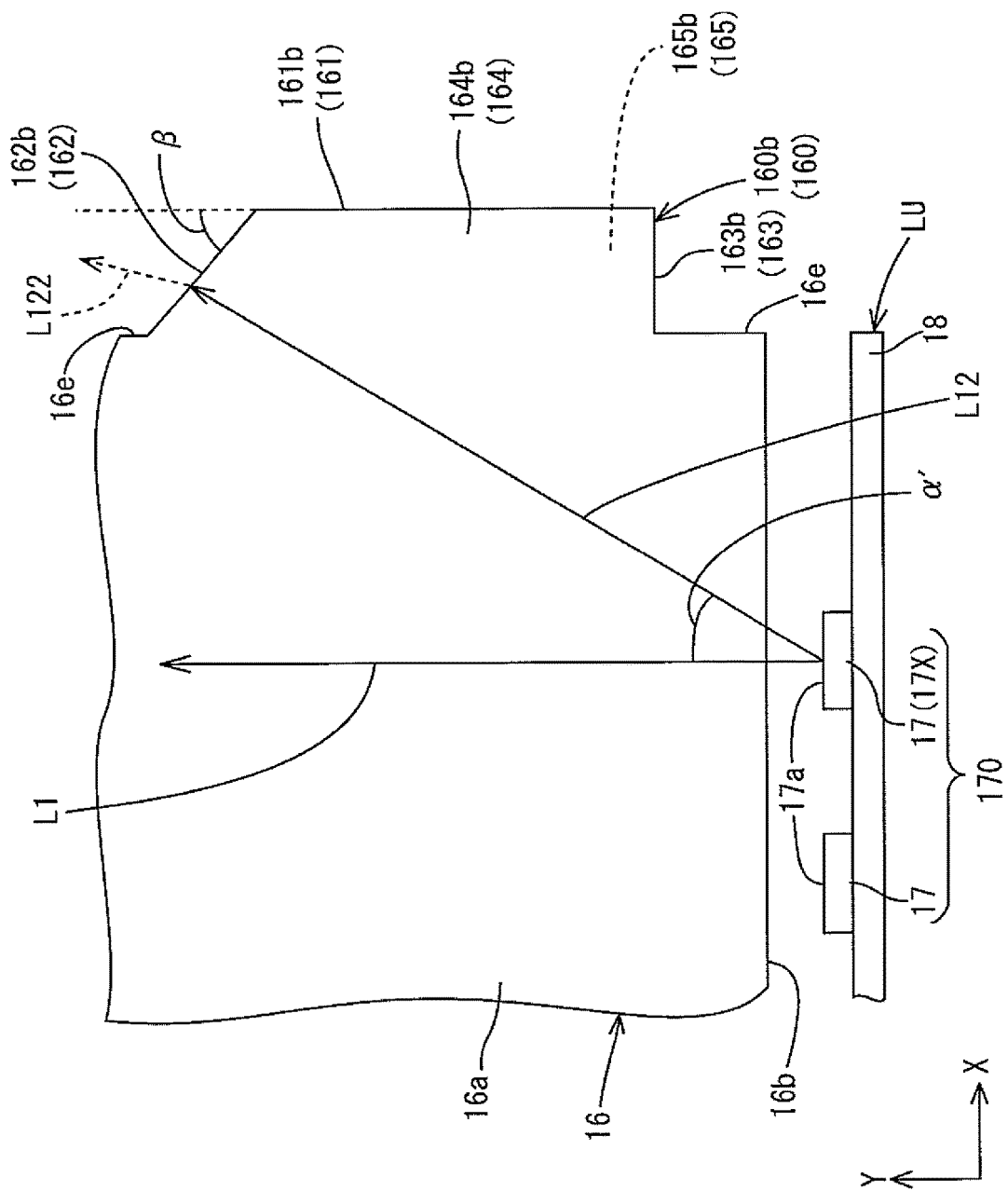
FIG. 10 is a plan view of the positioning projection portion of the light guide plate typically illustrating that another light emitted from the end-side light source travels into the positioning projection portion.

FIG. 10 is a plan view illustrating the positioning projection portion 160b of the light guide plate 16 where other light L12 emitted from the endmost light source 17X travels. In FIG. 10, light L12 is directed outwardly with respect to the optical axis L1 at an angle α' that is smaller than the angle α. The light L12 travels into the positioning projection portion 160b and is directly incident on the second edge surface 162b. Light that is directly incident on the second edge surface 162b, like the light L12, passes through the second edge surface 162b with refracted by the second edge surface 162b and leaks outside. However, light L122 that leaks through the second edge surface 162b is directed outwardly so s to be farther away from the edge portion of the liquid crystal panel 11. Therefore, unevenness in brightness is less likely to be caused on the display surface 11c of the liquid crystal panel 11.

As described above, even if the light emitted from the endmost light source 17X travels into the positioning projection portion 160b, the light is less likely to leak toward the edge portion (the edge surface) of the liquid crystal panel 11. Similarly, light travelling into another positioning projection portion 160a is less likely to leak therefrom toward the edge portion (the edge surface) of the liquid crystal panel 11. The light guide plate 16 includes the positioning projection portion 160a and the positioning projection portion 160b symmetrically with respect to the main body thereof. In the liquid crystal display device 10 according to the present embodiment, the positioning projection portion 160 (160a, 160b) of the light guide plate 16 has a certain shape. With this configuration, the light leaking from the positioning projection portion 160 (160a, 160b) is less likely to enter the liquid crystal panel 11 through the edge surface (the edge portion) thereof and linear uneven brightness (like searchlight) is less likely to be caused.

In the liquid crystal display device 10 according to this embodiment, the light guide plate 16 is formed of acrylic resin (PMMA). However, according to other embodiments, the light guide plate 16 may be formed of polystyrene (PS) resin, methyl methacrylate styrene (MS) resin, or polycarbonate (PC) resin. In such a configuration, the critical angle θc of the light guide plate is approximately 40. 8°. The critical angle may be varied according to the material that is used for the light guide plate. However, the critical angle θc of the light guide plate 16 is normally equal to or less than 43°. Therefore, the angle α is optimally 43° or less. The external angle β is optimally 43° or less.

In the liquid crystal display device 10 according to this embodiment, the external angle β is optimally 20° or greater. If the external angle β is 20° or greater, the light guide plate 16 is easily fixed in the liquid crystal display device 10 with using the positioning projection portions 160.

Second Embodiment

Figure 11:
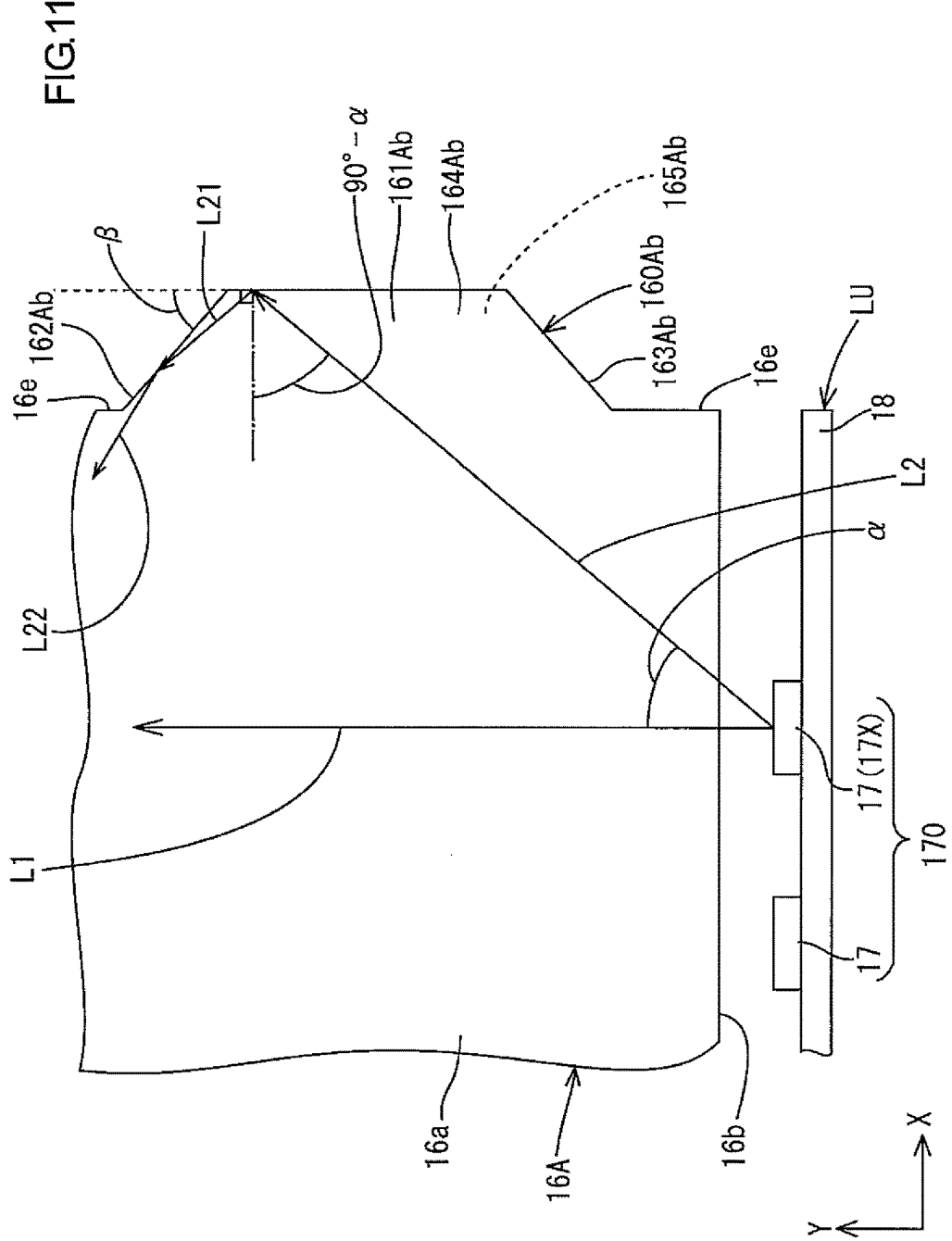
FIG. 11 is a plan view of a positioning projection portion of the light guide plate according to a second embodiment typically illustrating that light emitted from an endmost light source travels into the positioning projection portion.

The second embodiment will be described with reference to FIG. 11. The members and portions in the second embodiment same as those in the first embodiment are indicated by numerals same as those in the first embodiment and will not described in detail. In this embodiment, a liquid crystal display device including a light guide plate 16A will be described. FIG. 11 is a plan view typically illustrating the light guide plate including a positioning projection portion 160Ab according to the second embodiment. In FIG. 11, light emitted from the endmost light source 17X travels into the positioning projection portion 160Ab. The light guide plate 16A according to this embodiment differs from the light guide plate 16 in the first embodiment in the shape of the positioning projection portion 160Ab. Other structures of the light guide plate 16A are same as those of the light guide plate 16 of the first embodiment. As illustrated in FIG. 11, the positioning projection portion 160Ab includes a first edge surface 161Ab, a second edge surface 162Ab, a third edge surface 163Ab, a front surface 164Ab and a rear surface 165Ab.

As illustrated in FIG. 11, the positioning projection portion 160Ab according to this embodiment includes the third edge surface 163Ab that is adjacent to the first edge surface 161b and inclined with respect to the first edge surface 161b.

The positioning projection portion 160Ab has a shape such that a corner portion of the positioning projection portion 160b according to the first embodiment (a corner portion between the first edge surface 161b and the third edge surface 163b) is cut off. According to this embodiment, similarly to the first embodiment, the narrow-angle light L2 emitted from the endmost light source 17X reaches the first edge surface 161Ab of the positioning projection portion 160Ab. The external angle β between the first edge surface 161Ab and the second edge surface 162Ab is set to be the same value as the first embodiment. In this embodiment, the external angle between the first edge surface 161Ab and the third edge surface 163Ab is set to be the value same as the external angle β. Thus, as a shape of the positioning projection portion 160Ab, the first edge surface 161Ab and the third edge surface 163Ab may not be perpendicular to each other and the external angle between the first edge surface 161Ab and the third edge surface 163Ab may be altered as long as the object of the present invention is not hindered.

Third Embodiment

Figure 12:
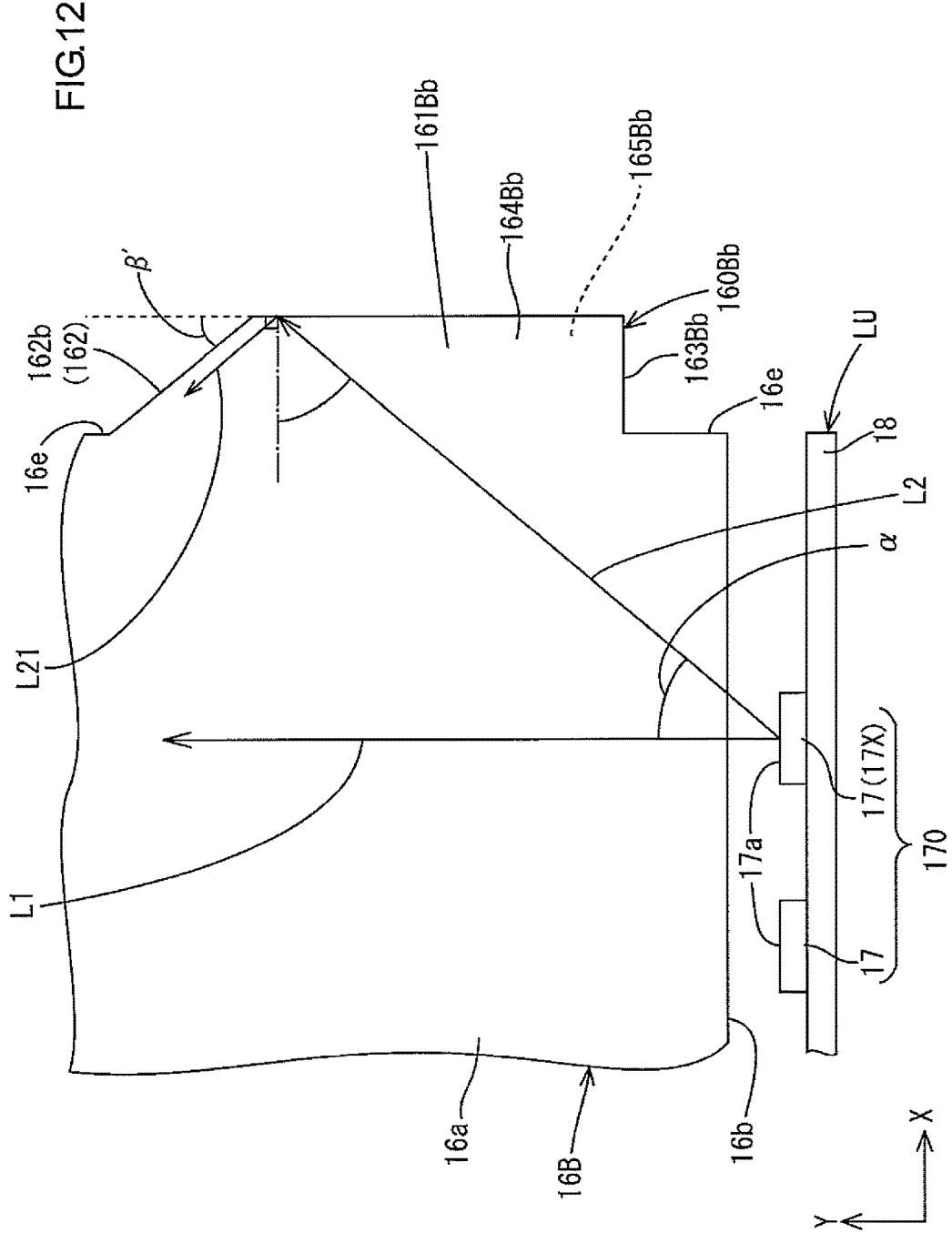
FIG. 12 is a plan view of a positioning projection portion of the light guide plate according to a third embodiment typically illustrating that light emitted from an endmost light source travels into the positioning projection portion.

Next, the third embodiment will be described with reference to FIG. 12. According to this embodiment, a liquid crystal display device including a light guide plate 16B will be described. FIG. 12 is a plan view typically illustrating the light guide plate 16B including a positioning projection portion 160Bb according to the third embodiment. In FIG. 12, light emitted from the endmost light source 17X travels into the positioning projection portion 160Bb. The light guide plate 16B according to this embodiment differs from the light guide plate 16 of the first embodiment in the shape of the positioning projection portion 160Bb. Other structures of the light guide plate 16B are same as those of the light guide plate 16 of the first embodiment. According to this embodiment, as illustrated in FIG. 12, the positioning projection portion 160Bb includes a first edge surface 161Bb, a second edge surface 162Bb, a third edge surface 163Bb, a front surface 164Bb, and a rear surface 165Bb.

In the positioning projection portion 160Bb according to this embodiment, an external angle β' between the first edge surface 161Bb and the second edge surface 162Bb is smaller than the external angle β in the first embodiment. The external angle β' is in the range of 20°≤β'≤θc. With a plan view of the light guide plate 16B, a length of the first edge surface 161Bb is equal to that in the first embodiment. With a plan view of the light guide plate 16B, a length of the second edge surface 162Bb is longer than that in the first embodiment to some extent. Namely, the positioning projection portion 160B of this embodiment has a configuration same as that in the first embodiment except for that the inclination angle of the second edge surface 162Bb is different from that in the first embodiment.

If the narrow-angle light emitted from the endmost light source 17X reaches the first edge surface 161Bb, the narrow-angle light L2 totally reflects off the first edge surface 161Bb. In FIG. 12, reflection light L21 does not reach the second edge surface 162Bb and travels through a portion on a side inner from the second edge surface 162Bb to be directed toward the main body of the light guide plate 16B. According to this embodiment, light leaking from the positioning projection portion 160Bb is less likely to be directed toward the edge portion (the edge surface) of the liquid crystal panel 11. The external angle β' between the first edge surface 161Bb and the second edge surface 162Bb of the positioning projection portion 160Bb may be smaller than the critical angle θc of the light guide plate.

Comparative Example

Figure 13:
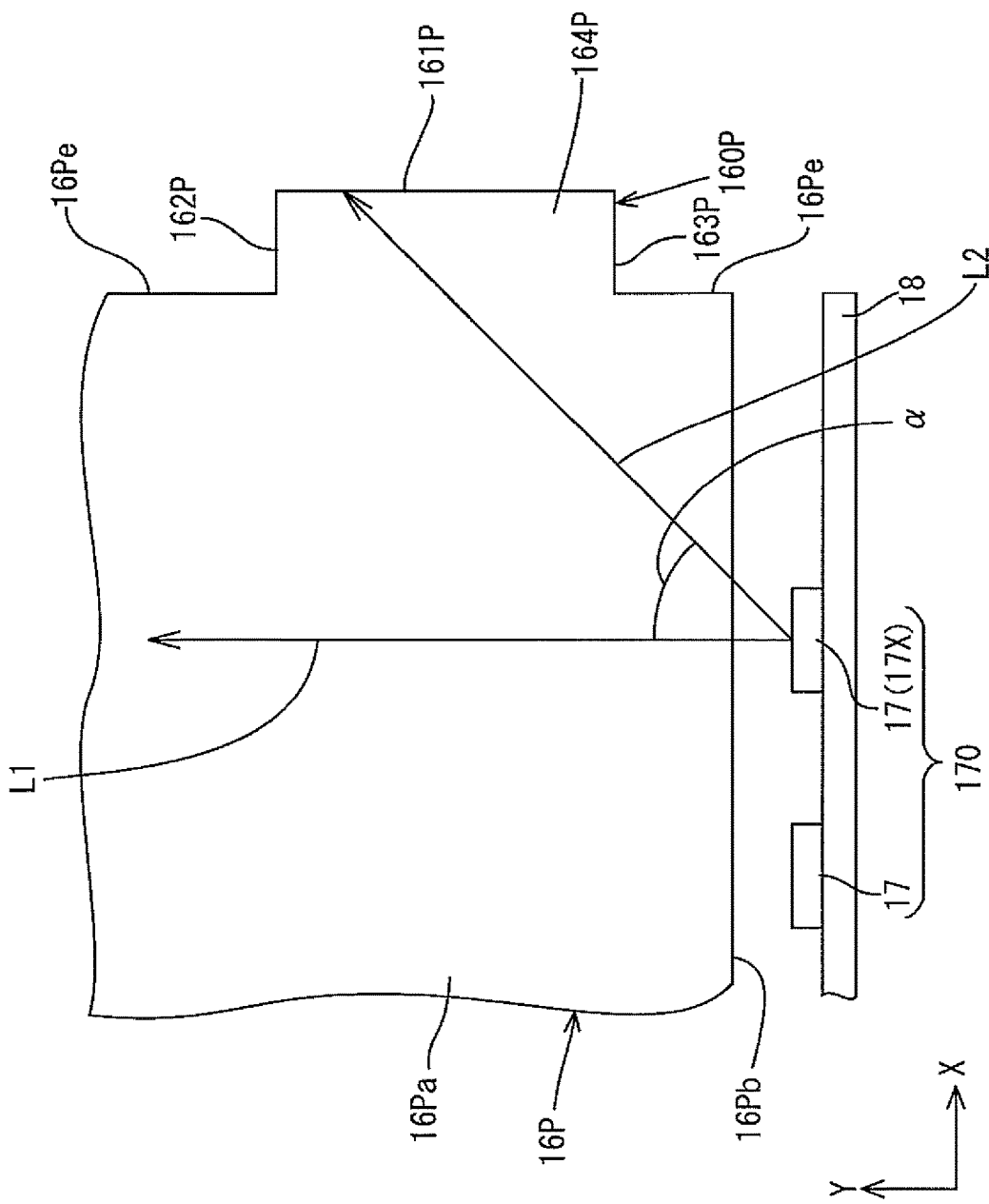
FIG. 13 is a plan view of a positioning projection portion of the light guide plate according to a comparative example typically illustrating that light emitted from an endmost light source travels into the positioning projection portion.
Figure 14:
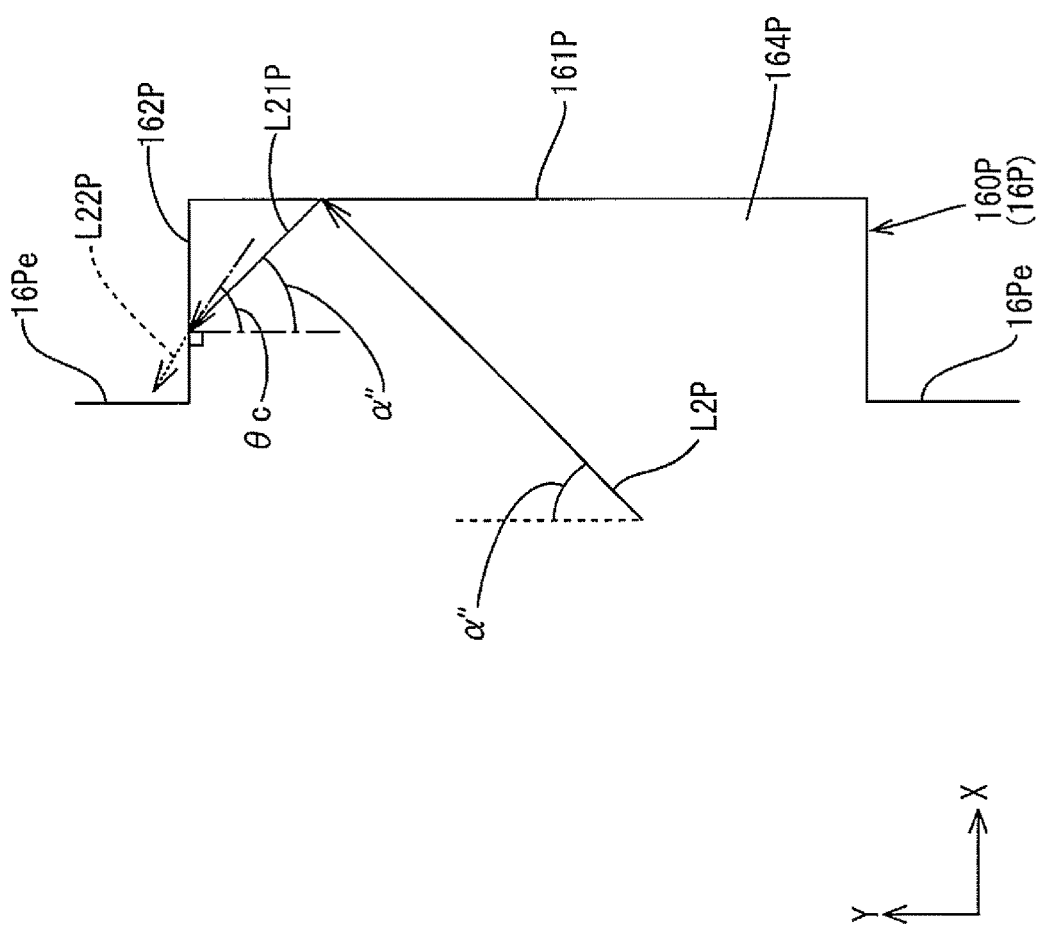
FIG. 14 is an enlarged plan view of FIG. 13.

Next, with reference to FIGS. 13 to 15, a liquid crystal display device 10P according to a comparative example will be described. FIG. 13 is a plan view illustrating a positioning projection portion 160P of a light guide plate 16P according to a comparative example. In FIG. 13, light emitted from the endmost light source 17X travels into the positioning projection portion 160P. FIG. 14 is an enlarged plan view of FIG. 13. FIG. 15 is a typical view illustrating that the light leaks from the positioning projection portion 160P of the light guide plate 16P toward the edge portion of the liquid crystal panel in the liquid crystal display device 10P according to the comparative example.

In the liquid crystal display device 10P according to the comparative example, a structure of the positioning projection portion 160P of the light guide plate 16P and a structure of a recess portion 134Pb that is fitted to the positioning projection portion 160P differ from the structures of the respective positioning projection portion and the recess portion according to the first embodiment. Other structures are same as those in the first embodiment.

In the light guide plate 16P included in the liquid crystal display device 10P according to the comparative example, similar to that in the first embodiment, the narrow-angle light L2 emitted from the endmost light source 17X directly reaches the first edge surface 161P of the positioning projection portion 160P. The first edge surface 161P is perpendicular to the second edge surface 162P and the external angle therebetween is 90°.

In FIG. 14, light L2P is directed outwardly at an angle α" (<θc) with respect to the optical axis L1. The angle α" is smaller than the angle α of the narrow-angle light L2. If the light L2P is incident on the first edge surface 161P, the light L2P totally reflects off the first edge surface 161P. The light L21P that has reflected off the first edge surface 161P is incident on the second edge surface 162P at an angle smaller than the critical angle θc. Therefore, the light L21P is refracted by the second edge surface 162P and transmits through the second edge surface 162P to leak outside. The light L22P that has leaked is directed toward the edge portion of the liquid crystal panel 11.

As illustrated in FIG. 15, the light L22P that has leaked from the positioning projection portion 160P is directed toward the edge portion (an edge portion of the CF substrate 11a, an edge portion of the array substrate 11b) of the liquid crystal panel 11. FIG. 14 illustrates a front-side plan view of the light guide plate 16P for easy understanding. In FIG. 14, the light L22P is directed toward a side edge surface 16Pe of the light guide plate 16P. However, actually, light leaks outside from the positioning projection portion 162P through the second edge surface 162P and is directed toward the edge surface of the liquid crystal panel 11. Rays of light including the light L22P that are directed toward the edge portion of the liquid crystal panel 11 enter the liquid crystal panel 11 through the edge portion (an edge surface) thereof and travels into an area of the display surface 11 (the display area 11c1). Accordingly, linear unevenness in brightness (like searchlight) occurs on the display surface 11c (the display area 11c1) of the liquid crystal panel and a display error is caused in the liquid crystal display device 10P. Thus, in the liquid crystal display device 10P according to the comparative example, the positioning projection portion 160P of the light guide plate 16P has a shape different from that in the above embodiments, and therefore, unevenness in brightness occurs in the liquid crystal panel.

Other Embodiments

The present invention is not limited to the above embodiments explained in the above description and the drawings. The technology described herein may include the following embodiments.

(1) In the above embodiments, light is incident on one edge surface of the light guide plate. In other embodiments, light may be incident on two or more edge surfaces of the light guide plate.

(2) In the above embodiments, the light guide plate includes one positioning projection portion on each of two side edge surfaces. However, in other embodiments, the light guide plate may include two or more positioning projection portions on one side edge surface.

(3) In the above embodiments, one light guide plate includes two positioning projection portions. However, in other embodiments, one light guide plate may include one positioning projection portion. The light guide plate is positioned by the positioning projection portion and with another positioning method (for example, inserting a stopper pin included in the chassis into the light guide plate in a thickness direction thereof).

(4) In the above embodiments, the LEDs are used as the light sources. However, in other embodiments, other light sources other than the LEDs (point light sources) may be used as long as the object of the invention is not hindered.

(5) In other embodiments, the number of LED boards included in the device, arrangement of the LED boards, the number of LEDs mounted on the LED board, and arrangement of the LEDs on the LED board may be optimally altered as long as the object of the invention is not hindered.

(6) In the above embodiments, the liquid crystal panel and the chassis are arranged in the vertical position such that the short-side direction thereof matches the vertical direction. However, the liquid crystal panel and the chassis may be arranged in the vertical position such that the long-side direction thereof matches the vertical direction.

(7) In the above embodiments, the TFTs are used as switching components of the liquid crystal display device. However, the technology described herein may be applied to liquid crystal display devices using switching components other than TFTs (e.g., thin film diodes (TFDs)). Furthermore, the technology may be applied to a liquid crystal display device including a black-and-white liquid crystal display panel other than a liquid crystal display device including a color liquid crystal display panel.

(8) In the above embodiments, the liquid crystal display device includes the liquid crystal panel as the display panel. However, the technology described herein may be applied to display devices including other kinds of display panels.

(9) In the above embodiments, the television device includes the tuner. However, the technology can be applied to display devices without including a tuner.

(10) In other embodiments, the liquid crystal display device may not include the optical member or the reflection sheet.

EXPLANATION OF SYMBOLS

10: liquid crystal display device (display device), 11: liquid crystal panel (display panel), 11a: color filter substrate, 11b: array substrate, 11c: display surface, 11c1: display area, 11c2: non-display area, 11d: rear surface, 12: backlight device (lighting device), 13: frame, 13a: opposed portion, 13b: outer wall, 13c: contact portion, 134a, 134b: recess portion, 14: chassis, 15: optical member (optical sheet), 16: light guide plate, 16a: front-side surface (light exit surface), 16b: light entrance surface, 16c: long-side edge surface, 16d, 16e: short-side edge surface (a side edge surface), 16f: rear surface, 160. 160a, 160b: positioning projection portion, 161: first edge surface, 162: second edge surface, 163: third edge surface, 17: LED (light source), 17X: endmost light source, 170: LED row (light source row), 18: LED board (light source board), 19: light source support member, 20: reflection sheet, TV: television device, L1: optical axis of the endmost light source, L2: narrow-angle light

The invention claimed is:

1. A display device comprising:
a display panel including a display surface on a front side thereof;
a light source row including light sources arranged in a row;
a light guide plate being a plate member and including:
a light entrance surface that is an edge surface of the plate member and opposed to the light source row and through which light from each of the light sources enters the light guide plate,
a light exit surface that is a front-side surface of the plate member and through which light exits the light guide plate toward a rear side of the display panel,
a side edge surface that is an edge surface of the plate member adjacent to the light entrance surface, the side edge surface being substantially perpendicular to the light entrance surface and being on an outer side than an edge of the display panel, and
a positioning projection portion included in the side edge surface at a portion that is adjacent to the light entrance surface, the positioning projection portion projecting outwardly from the side edge surface, the positioning projection portion including a projection, wherein among rays of light emitted from an end light source that is at an end of the light source row and entering the light guide plate through the light entrance surface, narrow-angle light directed outward at an angle α (the angle α is equal to a critical angle θc) with respect to an optical axis of the end light source enters the projection, and the positioning projection portion including a first edge surface and a second edge surface, wherein
the first edge surface is an edge surface of the projection that is farthest from the side edge surface and is parallel to the side edge surface, and the first edge surface where the narrow-angle light reaches, and
the second edge surface is an angled edge surface of the projection between the side edge surface and the first end surface, and the second edge surface and the first edge surface defining an external angle β that is equal to or smaller than the critical angle θc, and the second edge surface is farther from the light source row than the first edge surface,
a chassis having a plate shape that covers a rear side of the light guide plate and hold the positioning projection portion therein; and
a recess portion that fits to the positioning projection portion to be positioned with respect to the chassis.

2. The display device according to claim 1, wherein the external angle β is 43° or smaller.

3. The display device according to claim 1, wherein the external angle β is 20° or greater.

4. The display device according to claim 1, wherein the angle α is 43° or smaller.

5. The display device according to claim 1, wherein the light guide plate includes one of polymethylmethacrylate (PMMA), polystyrene (PS), methyl methacrylate styrene (MS), and polycarbonate (PC).

6. The display device according to claim 1, wherein the light sources are light emitting diodes having a Lambertian light distribution.

7. The display device according to claim 1, wherein the light sources are white light emitting diodes.

8. The display device according to claim 1, wherein a distance from the side edge surface to the optical axis of the end light source is equal to or smaller than a length of the first edge surface with a front-side plan view of the light guide plate.

9. The display device according to claim 1, wherein the display panel is a liquid crystal display panel including a pair of substrates and liquid crystals enclosed therebetween.

10. A television device comprising the display device according to claim 1.

11. The display device according to claim 1, wherein the light guide plate and the positioning projection portion have a same thickness.

12. The display device according to claim 1, wherein the positioning projection portion is closer to the light source row in a middle area of the side edge surface with respect to a longitudinal direction of the side edge surface.

13. The display device according to claim 1, wherein the positioning projection is adjacent to a corner between the light entrance surface and the side edge surface.

* * * * *